(12) United States Patent
Verenzuela et al.

(10) Patent No.: US 12,476,845 B2
(45) Date of Patent: Nov. 18, 2025

(54) FIRST AND SECOND COMMUNICATION DEVICES AND METHODS

(71) Applicant: Sony Group Corporation, Tokyo (JP)

(72) Inventors: Daniel Verenzuela, Stuttgart (DE); Thomas Handte, Stuttgart (DE); Dana Ciochina-Kar, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 131 days.

(21) Appl. No.: 18/269,571

(22) PCT Filed: Dec. 17, 2021

(86) PCT No.: PCT/EP2021/086467
§ 371 (c)(1),
(2) Date: Jun. 26, 2023

(87) PCT Pub. No.: WO2022/152501
PCT Pub. Date: Jul. 21, 2022

(65) Prior Publication Data
US 2024/0089149 A1 Mar. 14, 2024

(30) Foreign Application Priority Data
Jan. 14, 2021 (EP) .................................. 21151629

(51) Int. Cl.
*H04L 25/02* (2006.01)
*H04L 5/00* (2006.01)

(52) U.S. Cl.
CPC ...... *H04L 25/0204* (2013.01); *H04L 25/0226* (2013.01); *H04L 5/0023* (2013.01)

(58) Field of Classification Search
CPC ............. H04L 25/0204; H04L 25/0226; H04L 5/0023; H04L 5/0048; H04L 5/0062
(Continued)

(56) References Cited

U.S. PATENT DOCUMENTS 9,706,599 B1 7/2017 Zhang et al.
2013/0230038 A1 9/2013 Walton et al.
(Continued)

FOREIGN PATENT DOCUMENTS

CN 107210907 A 9/2017
CN 110710176 A 1/2020
(Continued)

OTHER PUBLICATIONS

International Search Report and Written Opinion mailed on Apr. 21, 2022, received for PCT Application PCT/EP2021/086467, filed on Dec. 17, 2021, 14 pages.
(Continued)

*Primary Examiner* — Fitwi Y Hailegiorgis
(74) *Attorney, Agent, or Firm* — XSENSUS LLP

(57) ABSTRACT

A first communication device that is configured to transmit data to a second communication device comprises circuitry configured to generate a second number of mutually orthogonal sequences; generate a third number of one or more spatial streams, each spatial stream carrying pay load data; generate a fourth number of transmission training sequences, each comprising, in addition to a distinct orthogonal sequence of said mutually orthogonal sequences,
(Continued)

one or more zeros and/or a subset of said distinct orthogonal sequence; generate a training field by mapping the transmission training sequences into a first number of training symbols, each training symbol spanning a plurality of tones; and arrange the training field before and/or between the payload of the spatial streams to enable channel estimation by the second communication device.

20 Claims, 11 Drawing Sheets

(58) Field of Classification Search
USPC .......................................................... 375/262
See application file for complete search history.

(56) References Cited

U.S. PATENT DOCUMENTS

| | | | |
|---|---|---|---|
| 2015/0023335 A1 | 1/2015 | Vermani et al. | |
| 2016/0255645 A1* | 9/2016 | Li | H04W 56/001 370/329 |
| 2016/0366659 A1* | 12/2016 | Yang | H04L 27/26025 |
| 2020/0092142 A1 | 3/2020 | Sethi | |

FOREIGN PATENT DOCUMENTS

| | | |
|---|---|---|
| JP | 2016530776 A | 9/2016 |
| JP | 2018521519 A | 8/2018 |

OTHER PUBLICATIONS

López et al., "Orthogonal Cover Code Design for 802.11be Extremely High Throughput WLANs", 2019 53rd Asilomar Conference on Signals, systems, and Computers, IEEE, Nov. 2019, pp. 655-659.
Li et al., "Efficient Spatial Covariance Estimation for Asynchronous Co-channel Interference Suppression in MIMO-OFDM Systems", IEEE Transactions on Wireless Communications, vol. 7, No. 12, Dec. 2008, pp. 4849-4853.
"Part 11: Wireless LAN Medium Access Control (MAC) and Physical Layer (PHY) Specifications", IEEE P802.11ax™/D6.0, IEEE Computer Society, Nov. 2019, pp. 1-780.
"Part 11: Wireless LAN Medium Access Control (MAC) and Physical Layer (PHY) Specifications", IEEE P802.11be™/D0.1, IEEE Computer Society, Sep. 2020, pp. 1-299.
"Part 11: Wireless LAN Medium Access Control (MAC) and Physical Layer (PHY) Specifications", IEEE Std 802.11™—2020, IEEE Computer Society, Dec. 3, 2020, pp. 1-4377.

* cited by examiner

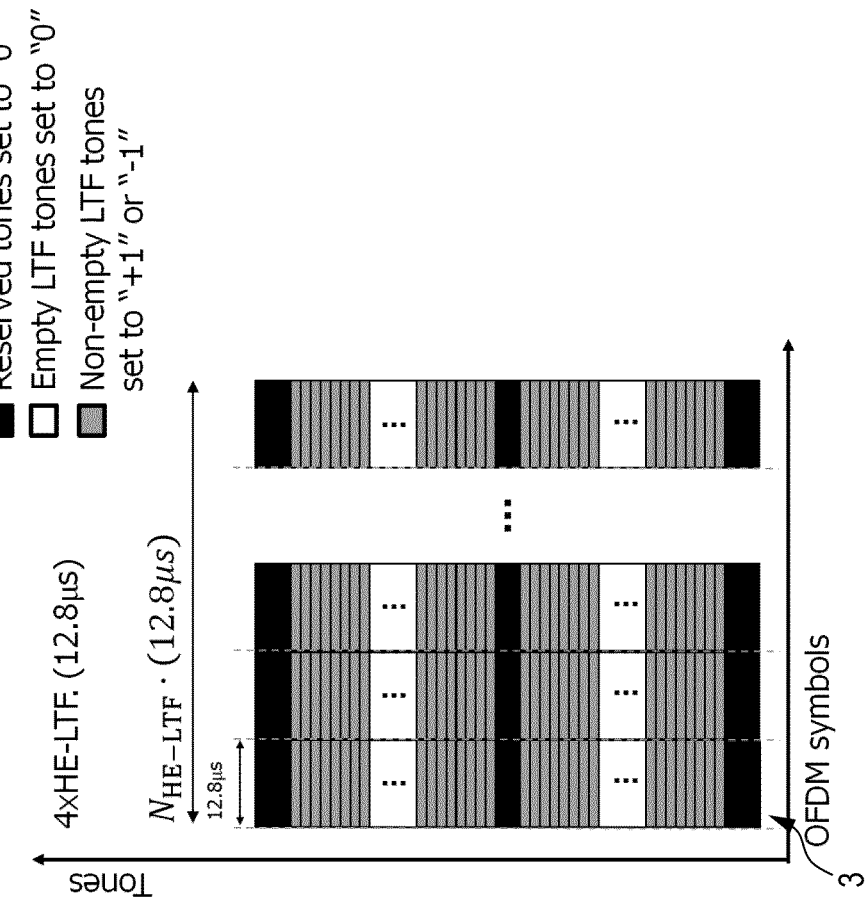
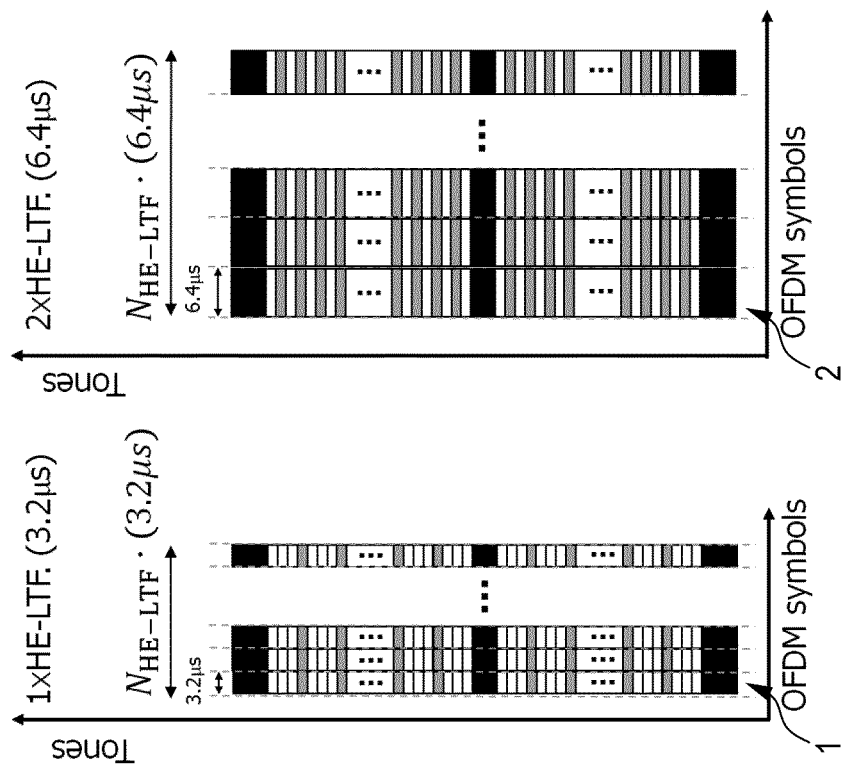
Fig. 1A  Fig. 1B  Fig. 1C

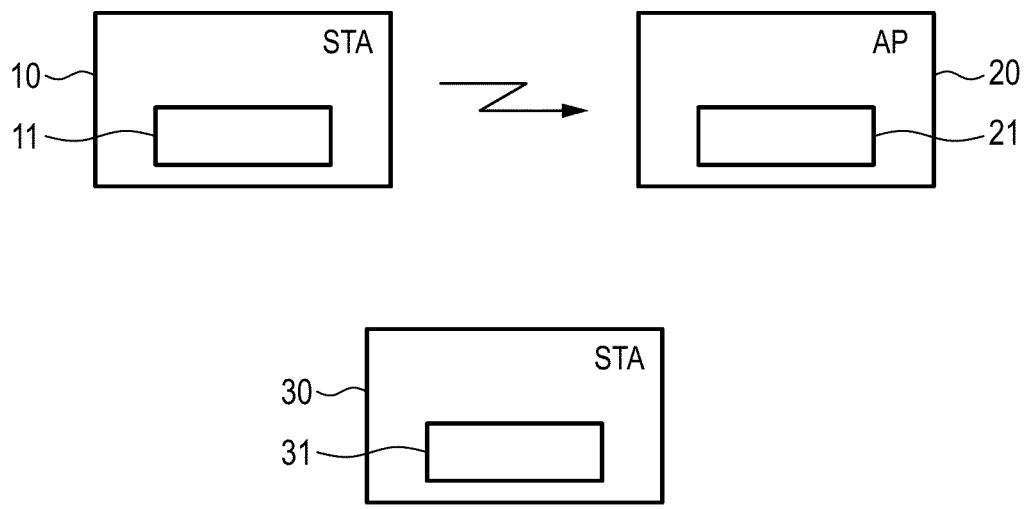
Fig. 5
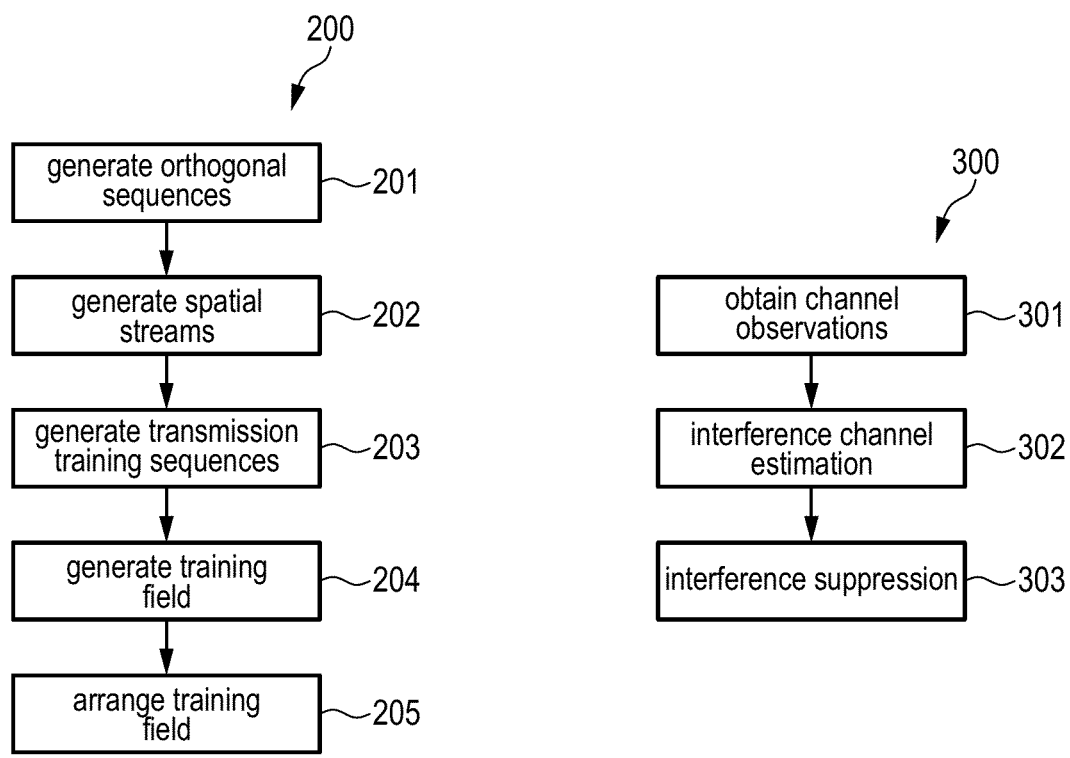
Fig. 6
Fig. 7

$$A_{E-LTF}^k = \begin{bmatrix} 0 & 1 & -1 & 0 & 1 & 1 & 0 & 0 \\ 0 & 1 & 1 & 0 & -1 & 1 & 0 & 0 \\ 0 & 1 & 1 & 0 & 1 & -1 & 0 & 0 \\ 0 & -1 & 1 & 0 & 1 & 1 & 0 & 0 \end{bmatrix}$$

$Sp = [1,0,0,1,0,0,1,1]$ $$Sp = \begin{bmatrix} 1 & 1 & 0 & 0 & 0 & 1 & 0 & 0 & 0 & 1 & 1 \end{bmatrix}$$

$$P_{4\times4} = \begin{bmatrix} 1 & 1 & 1 & 1 \\ 1 & -1 & 1 & 1 \\ 1 & 1 & -1 & 1 \\ 1 & 1 & 1 & -1 \end{bmatrix}$$

$$P_{6\times6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix}$$

$$P_{8\times8} = \begin{bmatrix} P_{4\times4} & P_{4\times4} \\ P_{4\times4} & -P_{4\times4} \end{bmatrix}$$

$$w = \exp\left(-j\frac{2\pi}{6}\right)$$

Fig. 12

FIRST AND SECOND COMMUNICATION DEVICES AND METHODS

CROSS-REFERENCE TO RELATED APPLICATIONS

The present application is based on PCT filing PCT/EP2021/086467, filed Dec. 17, 2021, which claims priority to EP 21151629.9, filed on Jan. 14, 2021, the entire contents of each of which are incorporated herein by reference.

BACKGROUND

Field of the Disclosure

The present disclosure relates to first and second communication devices and methods that are configured to communicate with each other.

Description of Related Art

Wireless communications suffer from interference when several transmitters access the channel at the same time and with the same frequency. In distributed access technologies like WLAN, the transmitters contend for the channel and collisions can occur. Moreover, in scenarios with high density of stations (STAs) and access points (APs) many basic service sets (BSS) may overlap, causing unwanted interference. In addition, WLAN operates in unlicensed spectrum which means that other transmitters from other technologies can use the same wireless channel. Due to these reasons, interference can arise during a communication between an STA and an AP or vice versa, leading to a communication disruption. That is, the receiver cannot decode the information causing a decrease in reliability as well as a decrease in throughput and increase in latency since the transmitter would need to retransmit the message.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly nor impliedly admitted as prior art against the present disclosure.

SUMMARY

It is an object to improve detection, channel estimation and suppression of interference at a receiver and to provide corresponding communication devices and methods. It is a further object to provide a corresponding computer program and a non-transitory computer-readable recording medium for implementing said methods.

According to an aspect there is provided a first communication device configured to transmit data to a second communication device, the first communication device comprising circuitry configured to:

generate a second number of mutually orthogonal sequences;
generate a third number of one or more spatial streams, each spatial stream carrying payload data;
generate a fourth number of transmission training sequences, each comprising, in addition to a distinct orthogonal sequence of said mutually orthogonal sequences, one or more zeros and/or a subset of said distinct orthogonal sequence;
generate a training field by mapping the transmission training sequences into a first number of training symbols, each training symbol spanning a plurality of tones; and
arrange the training field before and/or between the payload of the spatial streams to enable channel estimation by the second communication device,
wherein the first number of training symbols equals the length of the transmission training sequences,
wherein the first number of training symbols is set to be larger than the third number of spatial streams and/or the second number of orthogonal sequences is set to be larger than the third number of spatial streams, and
wherein the fourth number of transmission training sequences is set to be larger than or equal to the third number of spatial streams.

According to a further aspect there is provided a second communication device configured to receive data from a first communication device, the second communication device comprising circuitry configured to:

obtain one or more intended channel observations of one or more channels between the first communication device and the second communication device based on at least a part of a training field comprising a first number of training symbols, the training field being arranged before and/or between the payload of a third number of one or more spatial streams received from the first communication device, wherein each spatial stream carries payload data, each training symbol spans a plurality of tones, and a second number of mutually orthogonal sequences is comprised in a fourth number of transmission training sequences mapped into the training symbols of the training field;
perform interference channel estimation of one or more potential interference channels based on another part of said training field; and
perform interference suppression based on interference channel estimation information resulting from the interference channel estimation,
wherein the first number of training symbols equals the length of a transmission training sequence,
wherein the first number of training symbols is larger than the third number of spatial streams and/or the second number of orthogonal sequences is larger than the third number of spatial streams, and
wherein the fourth number of transmission training sequences is set to be larger than or equal to the third number of spatial streams.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed communication method, the disclosed computer program and the disclosed computer-readable recording medium have similar and/or identical further embodiments as the claimed communication devices and as defined in the dependent claims and/or disclosed herein.

One of the aspects of the disclosure is to enable a receiver (i.e. a second communication device) to obtain observations of interfering channels. Hereby, low signaling overhead and high channel estimation quality of intended transmitters is maintained by the present disclosure.

In this context, the terms "intended transmitter" and "intended STA", refer to the device (also called "first communication device" in this disclosure) transmitting the signals that the receiver (e.g. another station or an AP; also called "second communication device" in this disclosure) wants to decode. This means that for the data unit, e.g. a PHY protocol data unit (PPDU; also generally called "data unit" in this disclosure), sent by the intended transmitter, the receiver can achieve synchronization and decode signaling fields that may precede training fields. The "interfering transmitter" or "interferer" (also called "third communication device" in this disclosure) refers to another device (e.g. STA or AP) that is transmitting signals that disrupt the communication between the intended transmitter and the receiver.

The present disclosure enables interference detection, interference channel estimation and interference suppression at the receiver by designing sounding methods that increase the number of channel observations at the receiver compared to the current standard implementation. Different embodiments for increasing the number of channel observations are disclosed, including to add silent symbols (e.g. by adding zeros into transmission training symbols or by adding one or more zeros to the transmission training sequence) and to add more training symbols (e.g. by addition of replicated elements into transmission training symbols or by adding a subset of the transmission training sequence). These modifications enable the receiver to improve the decoding performance in the presence of interference increasing reliability and reducing the number of data retransmissions. Fewer data retransmissions reduce latency and increase throughput.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein:

FIG. 1 shows a diagram illustrating the three different HE-LTF types as defined in the WLAN 802.11ax amendment;

FIG. 5 shows a diagram illustrating a communication system including a first communication device and a second communication device according to the present disclosure;

FIG. 6 shows a flow chart of an embodiment of a first communication method of the first communication device according to the present disclosure;

FIG. 7 shows a flow chart of an embodiment of a second communication method of the second communication device according to the present disclosure;

FIG. 12 shows orthogonal sequence mapping matrices as defined in the WLAN 802.11ax standard;

DETAILED DESCRIPTION OF THE EMBODIMENTS

Figures 2, 3:
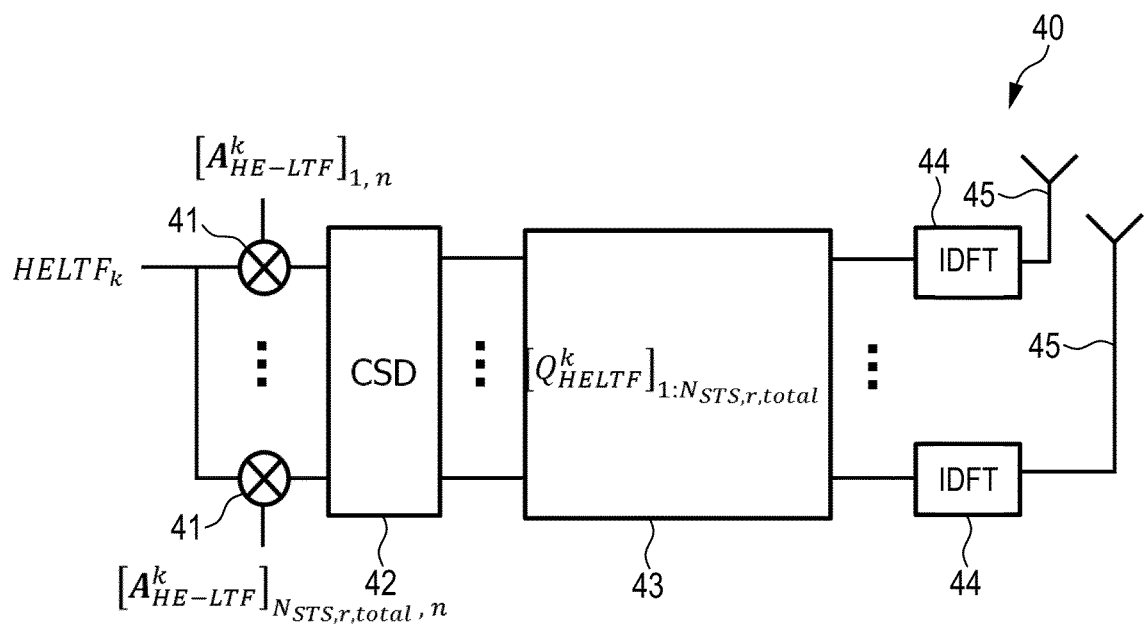
FIG. 2 shows a diagram of an example of orthogonal sequence mapping with four spatial streams.
FIG. 3 shows a schematic diagram of a generator for generating the sounding field as described in WLAN 802.11ax.

According to the WLAN 802.11 standard, the transmitter can adapt the modulation and coding scheme (MCS) to the channel conditions in order to control the level of redundancy of the transmitted information. This can provide robustness against interference at the expense of lower throughput and increased latency.

MIMO technologies have been incorporated into WLAN since several decades and give also the possibility to combat interference thorough signal processing without adding large overhead. If the receiver is equipped with several antennas it can use sounding signals, sent by the transmitters, to estimate the channel and suppress the interference among different spatial streams sent by one or more other (i.e. third party) transmitters.

The main limitation in WLAN is that only the intended transmitters send the sounding signals. If the interference originates from unintended transmitters, due to a collision or external sources, there are no sounding signals or procedures established to detect the presence of interference in an ongoing transmission or estimate the interfering channels.

The sounding signals in the latest WLAN 802.11ax amendment are called high efficiency long training field (HE-LTF). These signals are added within the preamble of a PHY protocol data unit (PPDU) or also in between the PPDUs as midambles inserted with a given periodicity to combat fast channel variations.

Referring now to the drawings, wherein like reference numerals designate identical or corresponding parts throughout the several views, FIG. 1 shows a diagram illustrating the three different HE-LTF types 1, 2, 3 as defined in the WLAN 802.11ax amendment. Each HE-LTF corresponds to one OFDM symbol (also called "training symbol" or "HE-LTF symbol" herein) composed of many tones that span the bandwidth of the channel used. There are three types of HE-LTF symbols 1, 2, 3 with different time durations and number of filled tones, i.e. a first type 1 (called 1xHE-LTF shown in FIG. 1A) with a duration of 3.2 µs of each training symbol, a second type 2 (called 2xHE-LTF shown in FIG. 1B) with a duration of 6.4 µs of each training symbol, and a third type 3 (called 3xHE-LTF shown in FIG. 1C) with a duration of 12.8 µs of each training symbol. The more tones are filled, the longer each HE-LTF symbol is.

The number of HE-LTF symbols is denoted by $N_{HE-LTF}$ and is selected in terms of the number of total spatial streams, denoted as $N_{sts}$, such that $$N_{HE-LTF} = \begin{cases} N_{sts} & \text{if } N_{sts} \text{ is 1, 2, 4, 6, or 8} \\ N_{sts} + 1 & \text{if } N_{sts} \text{ is 3, 5 or 7.} \end{cases}$$

As shown in FIG. 1 as well, each of the training symbols 1, 2, 3 has a number of reserved tones set to "0", empty LTF tones set to "0" and non-empty LTF tones set to "+1" or "−1".

Based on these designs of HE-LTF signals, the receiver can estimate the MIMO channel between itself and the transmitters at each non-empty tone. The channel estimates corresponding to the empty tones are obtained through interpolation techniques which are out of the scope of this disclosure and implementation dependent, but is generally known to the skilled person. For each non-empty data tone, the MIMO channel estimates are computed at the receiver based on orthogonal sequences of length $N_{HE-LTF}$ that are sent by the transmitters during the $N_{HE-LTF}$ symbols. These orthogonal sequences are stored in a squared matrix (i.e., with equal number of rows and columns) denoted as $P_{HE-LTF}$ (also called orthogonal sequence mapping matrix or HE-LTF mapping matrix herein) and each spatial stream is assigned a row of this matrix to transmit, as illustrated in FIGS. 2 and 3 for the case of $N_{HE-LTF}=4$.

FIG. 2 shows a diagram of an example of orthogonal sequence mapping with four spatial streams (SS). In this context, the term "orthogonal" means that the matrix multiplication of different rows of $P_{HE-LTF}$ is zero. Thus, the receiver can retrieve an observation of the channel between itself and each spatial stream sent by the transmitters without having interference between spatial streams.

FIG. 3 shows a schematic diagram of a generator 40 (of a transmitter) for generating the HE-LTF in described in WLAN 802.11ax (disclosed therein as FIG. 27-32). For the data tones in the HE-LTF, the orthogonal sequences that support MIMO channel estimation are stored in the matrix $A_{HE-LTF}^{k}=P_{HE-LTF}$. Each row, of the first $N_{sts}$ rows, of the $A_{HE-LTF}^{k}$ matrix is assigned to a spatial stream generating $N_{HE-LTF}$ HE-LTF symbols. If the $A_{HE-LTF}^{k}$ matrix has more rows than $N_{sts}$, the extra rows are not transmitted.

In more detail, the training symbols are called HE-LTF in this case. Initially, the following parameters are selected: the HE-LTF tone sequence (HELTF), the number of HE-LTF symbols ($N_{HE-LTF}$), and the number of spatial streams ($N_{sts}$). The orthogonal sequences are obtained as rows of the squared $P_{HE-LTF}$ matrix (i.e., same number of rows as columns) that consists of mutually orthogonal rows. The number of elements in each orthogonal sequence is equal to $N_{HE-LTF}$. To each spatial stream an orthogonal sequence is assigned. For each tone (indexed by k; it is the same procedure for all tones), each orthogonal sequence is multiplied in a multiplier module 41 with the corresponding HE-LTF tone sequence. This yields $N_{HE-LTF}$ HE-LTF symbols per spatial stream. For example if $N_{sts}=2$, $N_{HE-LTF}=2$ it holds:

|  |  |  | Symbol 1 | Symbol 2 |
|---|---|---|---|---|
| $P_{HE-LTF} = \begin{bmatrix} 1 & -1 \\ 1 & 1 \end{bmatrix}$ | → | SS1 | $HELTF_k \cdot (1)$ | $HELTF_k \cdot (-1)$ |
|  | → | SS2 | $HELTF_k \cdot (1)$ | $HELTF_k \cdot (1)$ |

After cyclic shifting in a cyclic shift diversity (CSD) module 42 that introduces a cyclic time shift for the signals of each spatial stream to avoid unintentional beamforming effects when several spatial streams are transmitted, the symbols from all spatial streams are combined by a matrix multiplication in a combination module 43 with the Q matrix to produce the symbols transmitted by each transmit antenna. The Q matrix has as many rows as number of transmit antennas ($N_{TX}$) 45 and as many columns as spatial streams ($N_{sts}$). It shall be noted that the Q matrix can be selected to be different for a subset of tones but the mapping procedure does not change. For each tone it holds that the training symbols can be represented by a matrix $A_k$ with as many rows as spatial streams ($N_{sts}$) and as many columns as the number of HE-LTF symbols ($N_{HE-LTF}$).

The transmitted symbols for each inverse discrete Fourier transformation (IDFT) module 44 and each transmit antenna 45 are read out from the rows of the result of the matrix multiplication $Q \cdot A_k$. Following the example mentioned above, and assuming a direct spatial mapping where $N_{TX}=2$ and each spatial stream is assigned to one antenna, that is, Q is an identity matrix, it holds:

$$Q = \begin{bmatrix} 1 & 0 \\ 0 & 1 \end{bmatrix} A_k = \begin{bmatrix} HELTF_k \cdot (1) & HELTF_k \cdot (-1) \\ HELTF_k \cdot (1) & HELTF_k \cdot (1) \end{bmatrix}$$

$$QA_k = \begin{bmatrix} HELTF_k \cdot (1) & HELTF_k \cdot (-1) \\ HELTF_k \cdot (1) & HELTF_k \cdot (1) \end{bmatrix}$$

The transmission of training symbols per antenna is as follows:

$$QA_k = \begin{matrix} \text{Training symbol 1} & \text{Training symbol 2} \\ \begin{bmatrix} HELTF_k \cdot (1) & HELTF_k \cdot (-1) \\ HELTF_k \cdot (1) & HELTF_k \cdot (1) \end{bmatrix} & \begin{matrix} \text{Transmit antenna 1} \\ \text{Transmit antenna 2} \end{matrix} \end{matrix}$$

An alternative example with a different Q matrix assumes an indirect spatial mapping where $N_{TX}=3$ and $$Q = \begin{bmatrix} 0.5 & 0.3 \\ 0.2 & 0.3 \\ 0.3 & 0.4 \end{bmatrix}.$$

The transmitted symbols at each transmit antenna are read out from the rows of the following matrix:

$$QA_k = \begin{bmatrix} 0.5 & 0.3 \\ 0.2 & 0.3 \\ 0.3 & 0.4 \end{bmatrix} \begin{bmatrix} HELTF_k \cdot (1) & HELTF_k \cdot (-1) \\ HELTF_k \cdot (1) & HELTF_k \cdot (1) \end{bmatrix} =$$

$$\begin{matrix} \text{Training symbol 1} & \text{Training symbol 2} \\ \begin{bmatrix} HELTF_k \cdot (0.5+0.3) & HELTF_k \cdot (-0.5+0.3) \\ HELTF_k \cdot (0.2+0.3) & HELTF_k \cdot (-0.2+0.3) \\ HELTF_k \cdot (0.3+0.4) & HELTF_k (-0.3+0.4) \end{bmatrix} & \begin{matrix} \text{Transmit antenna 1} \\ \text{Transmit antenna 2} \\ \text{Transmit antenna 3} \end{matrix} \end{matrix}$$

The maximum number of channels that can be estimated at the receiver is limited by the number of rows in $P_{HE-LTF}$, that is, the number of HE-LTF symbols $N_{HE-LTF}$ in the WLAN 802.11ax amendment. This means that to detect and estimate more channels than the number of spatial streams $N_{sts}$, like for example the interfering channel, the size of $P_{HE-LTF}$ needs to be larger.

To suppress the interfering signals with MIMO processing, it is necessary for the receiver to obtain an estimate of the interfering channel which means to observe the interference without the presence of the intended STAs. However, this is not possible in the current implementation of WLAN 802.11ax since the number of HE-LTF symbols are designed to match the number of spatial streams in most cases. Moreover, to obtain a good estimate of the interfering channel, several observations are needed and the maximum number of unused HE-LTF symbols is 1.

This disclosure seeks to enable interference detection, channel estimation and suppression at the receiver by designing new sounding methods that increase the number of channel observations compared to the current standard implementation. Thus, for this purpose an enhanced long training field (E-LTF) is envisioned that is built based on HE-LTF signals modified. Several embodiments for such a modification will be discussed in the following.

The modifications disclosed herein take place in the generation of a $A_{E-LTF}^k$ matrix that will replace the $A_{HE-LTF}^k$ matrix shown in FIG. 2. These modifications include changes on the elements of the $A_{E-LTF}^k$ matrix as well as its size, since the number of columns of the $A_{E-LTF}^k$ matrix corresponds to the number of E-LTF symbols (herein also called "training symbols"). These changes will enable interference channel estimation and suppression at the receiver.

To create E-LTF signals, it is defined how many E-LTF symbols will be transmitted. In the WLAN 802.11ax amendment the number of HE-LTF symbols is selected only based on the number of spatial streams, whereas according to the present disclosure the number of E-LTF symbols is chosen to balance the time overhead and the performance of MIMO interference suppression. Thus, in addition to the different embodiments of the proposed sounding methods, a method to select the number of E-LTF symbols will be disclosed as described in the following.

First, the boundaries of how many E-LTF symbols can be sent are evaluated, starting with the minimum number of E-LTF symbols. As mentioned above, at least as many orthogonal sequences (i.e. rows of the $P_{E-LTF}$ matrix which replaces $P_{HE-LTF}$ shown in FIG. 2) as the number of spatial streams, denoted as $N_{sts}$, are used. Thus, the minimum number of E-LTF symbols supports the use of a $P_{E-LTF}$ matrix of minimum size of $N_{sts} \times N_{sts}$. In addition, to obtain an estimate of the interference at least one more channel observation than the number of spatial streams $N_{sts}$ needs to be available at the receiver. Based on these conditions the minimum number of E-LTF symbols, denoted by $N_{minE-LTF}$, can be set.

For the maximum number of E-LTF symbols the following considerations hold. Since the E-LTF symbols are used for channel estimation it is necessary that the channel remains approximately static for the duration of the PPDU or until a midamble is sent, which is referred to as the coherence time. It can be estimated at any device based on statistical measurements of signals (e.g. during the association process of the devices to the BSS). Thus, the number of E-LTF symbols is such that the duration of the E-LTF is at least one OFDM symbol lower than the coherence time.

However, in practice it is desirable to have a small number of training symbols compared to data symbols to have a low time overhead, to achieve high throughput and/or low latency. Thus, the maximum number of E-LTF, denoted as $N_{maxE-LTF}$, depends on the specific receiver implementation and channel conditions to limit the time overhead and reach the desired performance in terms of throughput and latency.

Figure 4:
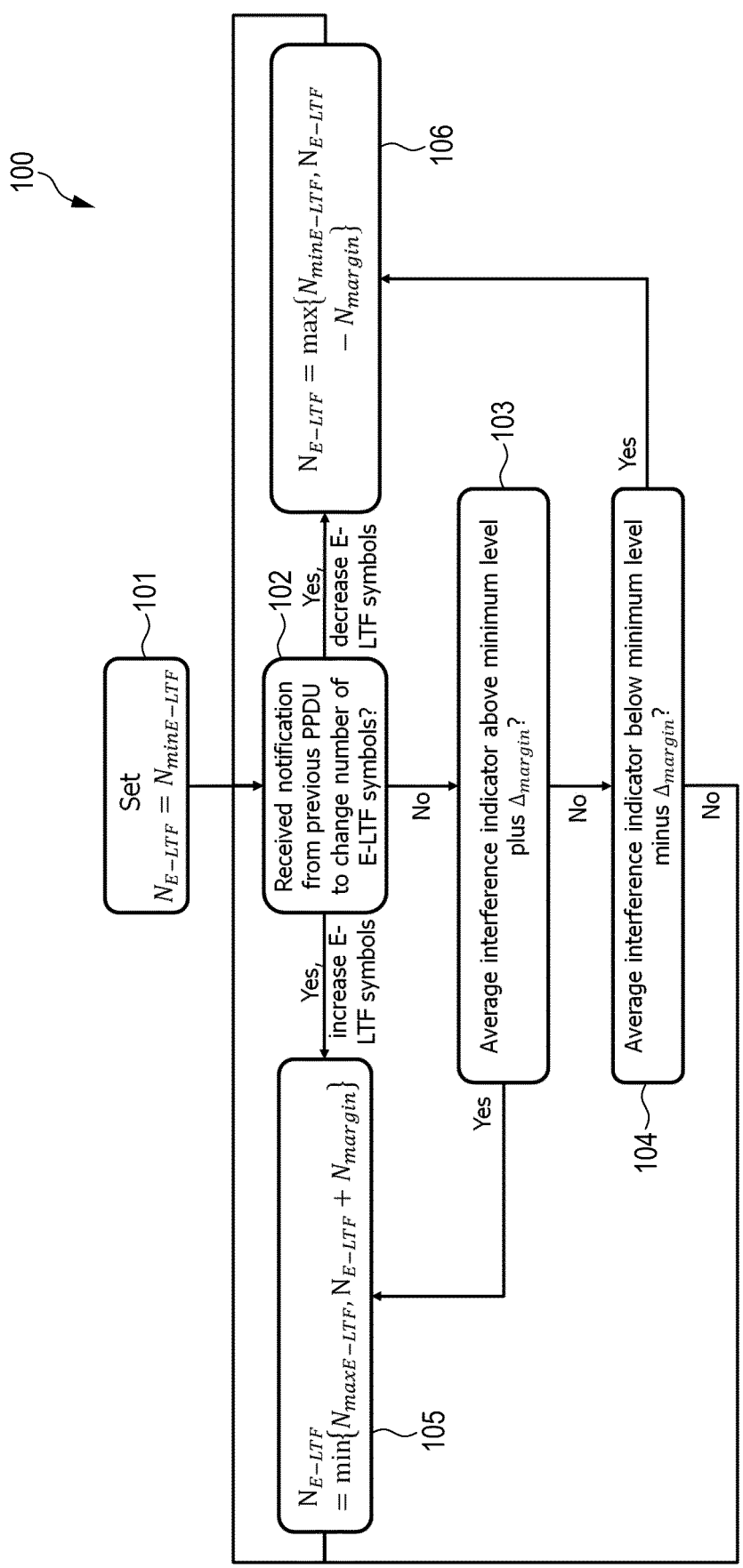
FIG. 4 shows a flow chart of a method for dynamically adjusting the number of training symbols within each data exchange between communication devices.

The performance of the MIMO suppression techniques at the receiver depends on the specific implementation and the channel conditions. Therefore, it is desirable to adapt the number of E-LTF symbols based on each specific situation. FIG. 4 shows a flow chart of a method 100 for dynamically adjusting the number of E-LTF symbols within each data exchange between communication devices. Herein, $N_{margin}$ is the number of E-LTF symbols to add or subtract in each data exchange, and $\Delta_{margin}$ is an interference indicator margin.

In a first step 101, before the first PPDU exchange, the transmitter sets the number of E-LTF symbols to the minimum $N_{minE-LTF}$. Then, the number of E-LTF symbols can be increased or decreased based on notifications made by the receiver after evaluating the performance of MIMO interference suppression in the past PPDUs. An indicator in the signaling fields of the response messages (e.g. Ack or MCS feedback) can be envisioned so that the receiver can suggest whether to increase or decrease the number of E-LTF symbols to the transmitter, which is then checked and decided by the transmitter in step 102.

If no notification is present, then in step 105 the transmitter can increase the number of E-LTF if an interference indicator, averaged over time, is above a set minimum plus a margin $\Delta_{margin}$, which is checked in step 103. This indicator can be created based on one or more of signal-to-interference plus noise (SINR) levels, received power levels, the number of active BSSs, and the number of past collisions, etc. If the interference indicator, averaged over time, is above the aforementioned value, it means that there are many potential interfering devices and the receiver would profit from having more E-LTF symbols for interference suppression. In contrast if the interference indicator, averaged over time, is below the minimum minus a margin $\Delta_{margin}$, which is checked in step 104, this indicates that the number of potential interferers is low and therefore the number of E-LTF symbols is decreased in step 106 to reduce the time overhead.

If neither of the above conditions is met, then the number of E-LTF symbols would remain unchanged for the next transmission. If there a notification is present, as checked in step 102, the number of E-LTF symbols is either increased in step 105 or decreased in step 106 according to the notification. To support the method shown in FIG. 4, the transmitter can e.g. add an indicator in the signaling fields of the PHY preamble to indicate the receiver how many E-LTF symbols are sent in the PPDU. The values of $N_{maxE-LTF}$, $\Delta_{margin}$, $N_{margin}$, and the minimum interference indicator depend on the receiver implementation, channel conditions and target throughput and/or latency constraints.

With respect to $N_{maxE-LTF}$ it is noted that usually a rule of thumb in MIMO communications that involve channel estimation suggests that 50% of the coherence time should be used for training symbols. Thus, $N_{maxE-LTF}$ should not exceed 70% of the coherence time and favorable results can be obtained for $N_{maxE-LTF}$ set to 50% of the coherence time.

With respect to $\Delta_{margin}$ it is noted that this parameter would control how often the number of E-LTFs are changed when no notification is present. In highly dynamic environments like malls or airports, it may be desirable to have this value small so that the number of E-LTFs is adapted at a faster pace. In contrast, in a more static environment like at a private apartment it may be desirable to set $\Delta_{margin}$ to a large value to avoid unnecessary changes to the E-LTFs. In terms of exact values, if the interference indicator is based on SINR or power levels, small values of $\Delta_{margin}$ would be around 3 dB (which means a factor of ×2), whereas large values would be between 10-20 dB (i.e., a factor of ×10 to ×100). It can be said that values below 1 dB are not feasible (since they would incur changes too often) and above 30 dB would result in almost no change of the E-LTFs. However, if the indicator is made based on the number of BSS, or number of past retransmissions, the margin would have different values. For example, if high reliability is desired, then after one retransmission or in the presence of one more BSS in the vicinity, the number of E-LTFs should be changed. A general range can be given in terms relative to the interference indicator. For example, the range of values for the margin would be between 0.5× to 100× the average interference indicator value.

With respect to $N_{margin}$ it is noted that this number should be a positive integer since only integer numbers of symbols can be added. The range of values could be from 1 to $N_{maxE-LTF}-1$, to indicate that the number of E-LTFs can be changed one at the time or makes big changes. From preliminary results it has been seen that doubling the number of E-LTFs can give significant gains. Thus, a typical behavior can be to set $N_{margin}$ equal to a factor of the previous number of E-LTF (e.g., 0.5× to 2×). Alternatively, since the maximum number of spatial streams allowed in IEEE 802.11ax is 8 the typical operation can be set between 1 to 16.

FIG. 5 shows a diagram illustrating a first communication device 10 (herein also called intended transmitter, representing e.g. a station STA) according to an aspect of the present disclosure for communicating with a second communication device 20 (herein also called receiver, representing e.g. an access point AP). The first communication 10 is able to exchange (receive and/or transmit) data with the second communication device 20 that may, optionally, exchange data with further communication devices (e.g. further stations that are not shown in FIG. 5). This communication, in particular one or more channels used for this communication, may be disturbed by interference, e.g. by a transmission of a third communication device 30 (herein also called non-intended or interfering transmitter, representing e.g. another station).

Each of the communication devices 10, 20, 30 comprises circuitry 11, 21, 31 that is configured to perform particular operations. The circuitries may be implemented by a respective processor or computer, i.e. as hardware and/or software, or by dedicated units or components. For instance, respectively programmed processors may represent the respective circuitries 11, 21, 31.

FIG. 6 shows a flow chart of an embodiment of a first communication method 200 of the first communication device 10 according to the present disclosure, which may be performed by the circuitry 11. In a first step 201 a second number of mutually orthogonal sequences is generated. In a second step 202 a third number of one or more spatial streams is generated, each spatial stream carrying payload data. In a third step 203 a fourth number of transmission training sequences is generated, each comprising, in addition to a distinct orthogonal sequence of said mutually orthogonal sequences, one or more zeros and/or a subset of said distinct orthogonal sequence. In a fourth step 204 a training field is generated by mapping the transmission training sequences into a first number of training symbols, each training symbol spanning a plurality of tones. In a fifth step 205 the training field is arranged before and/or between the payload of the spatial streams to enable channel estimation by the second communication device. Hereby, the first number of training symbols equals the length of the transmission training sequences, the first number of training symbols is set to be larger than the third number of spatial streams and/or the second number of orthogonal sequences is set to be larger than the third number of spatial streams, and the fourth number of transmission training sequences is set to be larger than or equal to the third number of spatial streams.

FIG. 7 shows a flow chart of an embodiment of a second communication method 300 of the second communication device 20 according to the present disclosure, which may be performed by the circuitry 21. In a first step 301 the second communication device 20 obtains one or more intended channel observations of one or more channels between the first communication device and the second communication device based on at least a part of a training field comprising a first number of training symbols, the training field being arranged before and/or between the payload of a third number of one or more spatial streams received from the first communication device, wherein each spatial stream carries payload data, each training symbol spans a plurality of tones, and a second number of mutually orthogonal sequences is comprised in a fourth number of transmission training sequences mapped into the training symbols of the training field. In a second step 302 interference channel estimation of one or more potential interference channels is performed based on another part of said training field. In a third step 303 interference suppression is performed based on interference channel estimation information resulting from the interference channel estimation. Hereby, the first number of training symbols equals the length of a transmission training sequence, the first number of training symbols is larger than the third number of spatial streams and/or the second number of orthogonal sequences is larger than the third number of spatial streams, and the fourth number of transmission training sequences is set to be larger than or equal to the third number of spatial streams.

In the following, various embodiments and potential implementations of the disclosed communication devices and methods will be described.

Figures 8A, 8B, 8C:
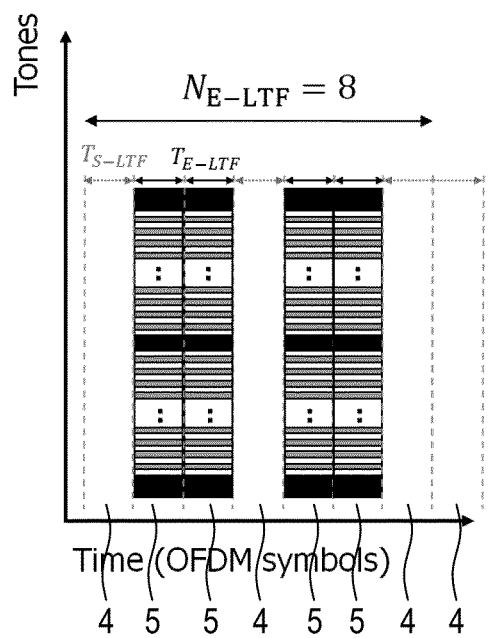
FIG. 8 shows a diagram and matrices illustrating an embodiment using multiple silent periods added in the sounding field.

According to a first embodiment that supports interfering channel estimation the transmitter remains silent for a set number of E-LTF symbols within the sounding time as illustrated in FIG. 8. For this purpose, empty (i.e. silent) E-LTF symbols 4 are inserted before, after and/or in between the regular E-LTF symbols (i.e. the regular training symbols; in this embodiment 2×E-LTF symbols) 5 as shown in FIG. 8A. This can be achieved by inserting columns with "0" (zero) to the $A_{E-LTF}^k$ matrix as shown in FIG. 8B. In these silent periods at the receiver, only the interference will be present, and the receiver can estimate the interfering channel. However, if the silent period is too long, other STAs may mistake the channel to be free and start a contention procedure that may lead to more collisions. Thus, the maximum duration of consecutive silent periods shall preferably not be longer than short interframe space (SIFS) or priority interframe space (PIFS).

FIG. 8 illustrates how multiple silent periods can be added in the sounding field. These periods are preferably a multiple of the E-LTF OFDM symbol time and lower than SIFS or PIFS. Thus, denoting $T_{S-LTF}$ as a silent period and $T_{E-LTF-OFDM}$ as the time duration of a E-LTF OFDM symbol, then the following equation holds:

$$T_{S-LTF} = (T_{E-LTF-OFDM}) \cdot N_{sl} \leq SIFS \text{ or } PIFS$$

where $N_{sl}$ is the number of E-LTF OFDM symbols included in the silent period $T_{S-LTF}$. The places where to insert the silent period in comparison to regular E-LTF symbols is set by a binary sequence, denoted as Sp, as shown in FIG. 8C. The Sp sequence has $N_{E-LTF}$ elements (in this case 8 elements) and indicates with a "1" if a silent period is present, or "0" if not, in which case a regular E-LTF symbol is present in the corresponding position with respect to the E-LTF symbols.

For legacy compatibility reasons, it is beneficial if all silent periods are at the end of the non-silent E-LTF OFDM symbols. At the same time the legacy header of a PPDU indicates the number of LTF symbols to be the number of non-silent E-LTF OFDM symbols.

The total number of silent periods is determined by the number of E-LTF symbols that may, in turn, be selected by the method shown in FIG. 4. In this case, the minimum number of E-LTF symbols would be $$N_{minE-LTF} = N_{sts} + 1.$$

This would allow for the receiver to estimate the channel to all spatial streams and have one silent period to estimate the interfering channel. Here, the Sp sequence would only have one "1" in any position.

The Sp sequence can be initialized with a default value based on initial measurements of interference (e.g., level of average received power and/or number of active BSS in the vicinity of the devices, and/or SINR). After each PPDU sent by the transmitter, the receiver can assess the effectiveness of the interference suppression method (e.g. SINR level and/or value of log-likelihood ratios per decoded symbol) and suggest a new value for the Sp sequence to be used in the next PPDU. An indicator in the signaling fields of response messages (e.g. Ack or MCS feedback) can be envisioned so that the receiver can suggest another Sp sequence to the transmitter.

Thus, as explained above, in the first embodiment the length of a silent period (consecutive silent LTFs) may not be longer than a predefined value of interframe space (IFS), here denoted as E-IFS, which can be for example SIFS, PIFS or DIFS. The granularity of silent periods is given by the LTF symbol time. For legacy reasons it is preferable to have the silent periods at the end of the training field.

To reduce the impact of phase noise it may be provided in an embodiment that non-empty LTF symbols are placed together. The LTFs are also used to fine tune an automatic gain control (AGC). AGC is a mechanism used to estimate the average received power of the signal at each antenna (or more specifically radio frequency chain). The AGC may be used to reduce the distortions introduced in the process of converting analog signals to digital signals. Thus, to have a good AGC tuning, it is desirable to have non-silent LTF symbols together.

In the legacy part of a PHY header an indication may be provided such that the silent symbols fall in the data part of a PPDU as seen by a legacy device. A non-legacy device sees the silent symbols as part of training fields which may be indicated in the non-legacy part of the PHY header.

In an embodiment a hierarchical method may be used to decide where to add the silent symbols. If the total number of silent symbols has a duration lower than or equal to E-IFS (condition i)), they shall be added at the end of the training field. If condition i) does not hold, the maximum number of silent LTFs that have a combined duration lower to or equal than E-IFS shall be placed at the end of the training filed.

Then, if the number of remaining silent symbols have a combined duration lower or equal to E-IFS, they shall be placed before the non-empty LTF symbols (condition ii)). If condition ii) does not hold, that is, there are more silent symbols to add (i.e. the total duration of all silent symbols is larger than 2×E-IFS), the non-silent LTFs shall be separated into the minimum amount of groups that enable good AGC estimation, have low phase noise impact and would allow the insertion of the remaining silent LTF symbols consecutively such that their combined duration is lower than or equal to E-IFS.

Thus, according to this first embodiment, initially the following parameters are selected: The E-LTF tone sequence (ELTF), the number of E-LTF symbols ($N_{E-LTF}$; also called "first number" herein), and the number of spatial streams ($N_{sts}$; also called "third number" herein). The orthogonal sequences are obtained as rows of the squared $P_{E-LTF}$ matrix (i.e., same number of rows as columns) that consists of mutually orthogonal rows. The number of elements in each orthogonal sequence is equal to $N_{col-P_{E-LTF}} \leq N_{E-LTF} - 1$. Each spatial stream is assigned an orthogonal sequence, i.e. $N_{sts} \leq N_{col-P_{E-LTF}}$ ($N_{col-P_{E-LTF}}$ also called "second number" herein). A transmission training sequence is comprised of an orthogonal sequence and zero elements (which correspond to silent symbols in this first embodiment). Thus, in this case the number of transmission training sequences (also called fourth number) is $N_{sts}$. For each tone, each transmission training sequence is multiplied with the E-LTF tone sequence corresponding to $N_{E-LTF}$ E-LTF symbols per spatial stream.

In an example it holds: $N_{sts}=2$, $N_{col-P_{E-LTF}}=2$, $N_{E-LTF}=4$. The number of silent symbols is $N_{E-LTF}-N_{col-P_{E-LTF}}=2$. The location of the silent symbols is set as Sp=[1 0 0 1]:

|  |  |  | Symbol 1 (silent) | Symbol 2 | Symbol 3 | Symbol 4 (silent) |
|---|---|---|---|---|---|---|
| $P_{E-LTF} = \begin{bmatrix} 1 & -1 \\ 1 & 1 \end{bmatrix}$ | → | SS1 | 0 | $ELTF_k \cdot (1)$ | $ELTF_k \cdot (-1)$ | 0 |
|  | → | SS2 | 0 | $ELTF_k \cdot (1)$ | $ELTF_k \cdot (1)$ | 0 |

There are two transmission training sequences in this example (i.e. the fourth number is 2) and they are: For SS1=>[0 1 −1 0]; for SS2=>[0 1 1 0]. The product between transmission training sequences and training symbols, for the $k^{th}$ tone, is given on the rows of the table above. Generally, there are (a third number of) spatial streams that are used for data transmission and zero or more additional extension spatial streams that are used for sounding only. For that reason, the fourth number of transmission training sequences is larger than or equal to the third number.

Figures 8D, 8E:
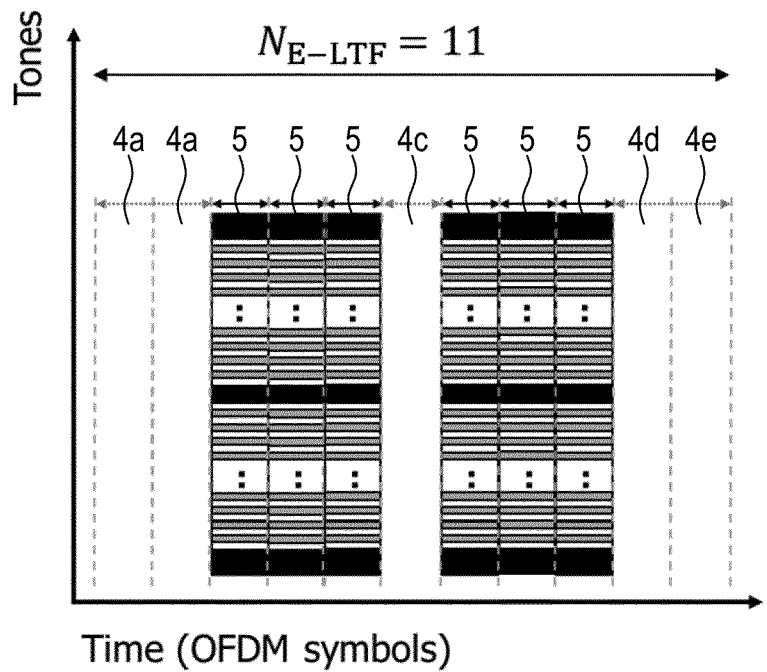

In another example illustrated in FIG. 8D five silent LTFs 4a-4e and six non-silent LTFs 5 shall be assumed, wherein two silent LTFs 4 have a duration equal to E-IFS. Since two LTF symbols amount to E-IFS there cannot be more than two consecutive silent symbols 4. Thus, the location of silent symbols 4 may be selected as follows:

a) Take the maximum number of symbols that fit into an interval lower than or equal to E-IFS (this means two silent symbols 4d, 4e) out of the total number of silent symbols (five silent symbols 4a-4e) and place them at the end.

b) Take the maximum number of symbols that fit into an interval lower than or equal to E-IFS (this means two silent symbols 4a, 4b) out of the remaining silent symbols (three remaining silent symbols 4a-4c), and place them at the beginning.

c) If there are more silent symbols to insert (one silent symbol 4c left in this case), and their combined duration is lower than or equal to E-IFS, separate the non-silent LTFs 5 in minimum number of groups (two in this case) and insert the silent symbols (one silent symbol 4c in this case in between.

The corresponding binary sequence Sp will thus be as shown in FIG. 8E.

According to a second and third embodiment the number of E-LTF symbols is increased to be larger than the number of spatial streams. This allows to also improve channel estimation for the intended transmitters apart from enabling interference channel estimation and suppression at the receiver. According to a second embodiment one or more of the E-LTF symbols are replicated and, when suitable, a tone shift is performed in the frequency domain. According to a third embodiment the number of rows of the $P_{E-LTF}$ matrix is increased so that more orthogonal sequences than the number of spatial streams are available.

Figure 9:
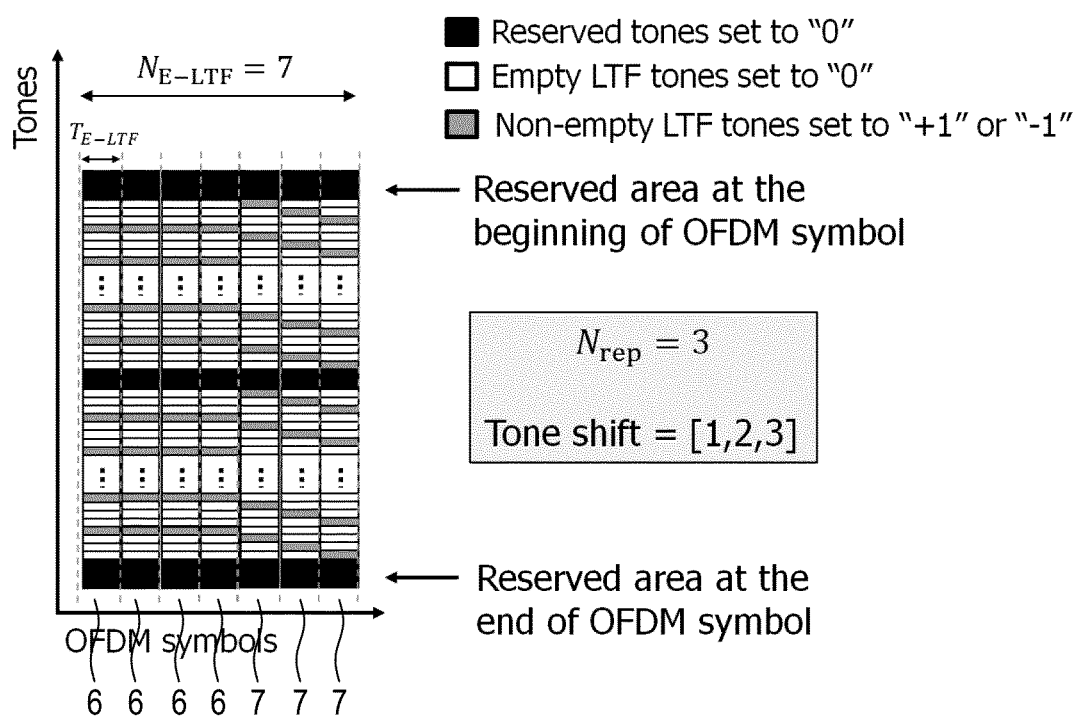
FIG. 9 shows a diagram illustrating an embodiment using replicated symbols added in the sounding field.
Figures 10, 11:
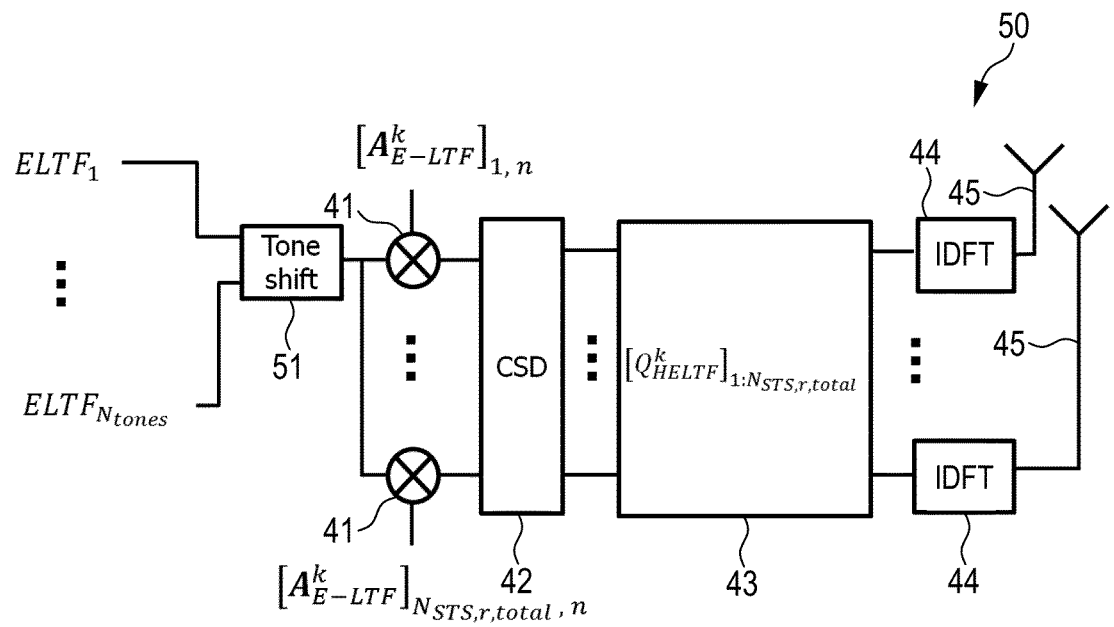
FIG. 10 shows a matrix including replicated columns.
FIG. 11 shows a schematic diagram of a generator for generating the sounding field shown in FIG. 9.

According to the second embodiment a set number of E-LTF symbols, denoted as $N_{rep}$, is replicated so that the total number of E-LTF symbols is given by $$N_{E-LTF}=N_{rep}+N_{col-P_{E-LTF}}$$

where $N_{col-P_{E-LTF}}$ is the number of columns in the $P_{E-LTF}$ matrix. This can be achieved by replicating columns of the $A_{E-LTF}^k$ matrix as shown in FIG. 10 (the replications are also called "subsets of distinct orthogonal sequences" herein). FIG. 9 shows an example of how three (of the four) regular 1xE-LTF symbols 6 are repeated as replicated 1xE-LTF symbols 7 with an (optional) frequency tone shift of 1, 2 and 3 tones, respectively. The tone shift by a tone shifting circuitry 51 can be implemented before the $A_{E-LTF}^k$ matrix mapping as illustrated in the block diagram of FIG. 11 showing a generator 50 (of a transmitter) for generating the E-LTF shown in FIG. 9, where $N_{tones}$ represents the total number of tones. The generator 50 is partly similar to the generator 40 shown in FIG. 3 and uses the same reference signs for the same elements.

In the replicated versions of the E-LTF symbols a frequency tone shift may be added to improve the interference channel estimation in other tones. For the 1xE-LTF there are three possible frequency shifts since the non-empty tones are placed every 4 tones (as shown in FIG. 1A). For 2xE-LTF there is only one frequency shift possible. Not all tones of an OFDM symbol can be used for transmitting sounding sequences, but there are reserved tones for guard bands and DC frequencies. Thus, the frequency tone shifts should respect the following conditions:

i) The tone distance between non-empty tones shall be the same, except when reserved tone areas are present, which would only add "0" values. Non-empty tones cannot be closer than the predetermined spacing (i.e., every 4 tones in 1xE-LTF and every 2 tones in 2xE-LTF).

ii) If the tone shift operation cannot maintain the number of non-empty tones and predetermined tone spacing, then non-empty tones that fall under reserved areas shall be removed (i.e., set to "0").

According to this embodiment, the first (in the example shown in FIG. 9 four) E-LTF symbols match the number of spatial streams so that channel estimation to each spatial stream is enabled at the receiver. Then, the replicated E-LTF symbols 7 contain the same information from the intended STA but not from the interferer so that the receiver can create observations of the interfering channel from the differences between original symbols 6 and replicated symbols 7. The optional tone shifts can add a level of diversity to differentiate the interfering channel from the intended STA channel.

According to this embodiment the minimum number of E-LTF symbols is given by $$N_{minE-LTF}=N_{sts}+1,$$

such that $N_{rep}=1$. In general, the number of replicated symbols can be obtained from the total number of E-LTF symbols as $$N_{rep}=N_{E-LTF}-N_{sts}$$

where $N_{E-LTF}$ is set by the method shown in FIG. 4.

The tone shift depends on the receiver implementation and channel conditions. Thus, an indicator of two bits per additional E-LTF symbols for 1xE-LTF and one bit per E-LTF symbol for 2xE-LTF can be envisioned in the PHY signaling fields of the preamble to set which tone shift is being used by the transmitter. After each PPDU sent by the transmitter, the receiver can assess the effectiveness of the interference suppression method (e.g. SINR level and/or value of log-likelihood ratios per decoded symbol) and suggest a new tone shift option to be used in the next PPDU. Thus, an indicator in the signaling fields of response messages (e.g. Ack, MCS feedback) can be envisioned so that the receiver can suggest another tone shift option for replicated E-LTF symbols to the transmitter.

Thus, according to this second embodiment, in addition to the selection of parameters as explained above with respect to the first embodiment, the number of replicated symbols is $N_{rep}=N_{E-LTF}-N_{col-P_{E-LTF}}$. For each replicated symbol a tone shift may be applied. For each tone, each orthogonal sequence is multiplied with the E-LTF tone sequence corresponding to non-replicated E-LTF symbols. This yields $N_{col-P_{E-LTF}}$ non-replicated E-LTF symbols per spatial stream. The replicated E-LTF symbols are copies of the non-replicated E-LTF symbols for each spatial stream with the additional tone shift (if present).

In an example it holds: $N_{sts}=2$, $N_{col-P_{E-LTF}}=2$, $N_{E-LTF}=4$. The number of replicated symbols is $N_{rep}=2$. The tone shift is selected as [1 3], that is the first replicated E-LTF symbol has a one-tone shift and the second replicated symbol has a three-tone shift:

|  |  |  | Symbol 1 | Symbol 2 | Symbol 3 (replica with tone shift 1) | Symbol 3 (replica with tone shift 3) |
|---|---|---|---|---|---|---|
| $P_{E-LTF} = \begin{bmatrix} 1 & -1 \\ 1 & 1 \end{bmatrix}$ | $\rightarrow$ | SS1 | $ELTF_k \cdot (1)$ | $ELTF_k \cdot (-1)$ | $ELTF_{S_{k+1}} \cdot (1)$ | $ELTF_{S_{k+3}} \cdot (-1)$ |
|  | $\rightarrow$ | SS2 | $ELTF_k \cdot (1)$ | $ELTF_k \cdot (1)$ | $ELTF_{S_{k+1}} \cdot (1)$ | $ELTF_{S_{k+3}} \cdot (1)$ |

The transmission training sequences are: for SS1=>[1 −1 1 −1], for SS2=>[1 1 1 1]. The product between transmission training sequences and training symbols, for the $k^{th}$ tone, is given on the rows of the table above. Examples of tone shifts are:

$$ELTF_{S_{k+1}} = \begin{cases} ELTF_{k+1} & \text{in case non-zero tones do not fall into reserved areas} \\ 0 & \text{in the case the tone shift corresponds to a non-zero tone falling into a reserved area} \end{cases}$$

$$ELTF_{S_{k+3}} = \begin{cases} ELTF_{k+3} & \text{in case non-zero tones do not fall into reserved areas} \\ 0 & \text{in the case the tone shift corresponds to a non-zero tone falling into a reserved area} \end{cases}$$

According to a third embodiment, for data tones it holds $A_{E-LTF}^k = P_{E-LTF}$. If the number of rows in the $P_{E-LTF}$ matrix is larger than the number of spatial streams more E-LTF symbols than spatial streams are transmitted. The number of unused rows in the $P_{E-LTF}$ matrix forms a signal space orthogonal to the spatial streams transmitted by the intended transmitters. By projecting the received E-LTF symbols into this orthogonal space, the receiver can estimate the interfering channels. This approach is more beneficial than adding silent symbols since the E-LTF signals transmitted by the intended STAs will have more symbols, which in turn, increases the spreading gain from the orthogonal projections and makes the sounding sequences more robust to noise.

As in the first and second embodiments, the third embodiment adds further time overhead to the transmissions, compared to the conventional training fields in WLAN (e.g., 802.11ax). Therefore, this approach is preferably applied for (however not limited to) 1xE-LTF and 2xE-LTF signals that have a short symbol duration compared to 4xE-LTF. However, this embodiment is more flexible, in terms of estimating the intended channel, than the second embodiment because the $P_{E-LTF}$ matrix can be increased in a symbol by symbol basis so that there is no need to replicate all the columns of the $P_{E-LTF}$ matrix.

Changing the size of the number of E-LTF symbols requires a redesign of the $P_{E-LTF}$ matrix since there are fixed sizes set in the standard. Designing $P_{E-LTF}$ matrices can be done by a simple manipulation of well-known DFT or Hadamard matrices. FIG. 12 shows $P_{HE-LTF}$ matrices as defined in the WLAN 802.11ax standard. In the following two examples are explained on how to obtain the $P_{E-LTF}$ matrices based on the same building blocks that exist in the standard. In particular, examples of generating $P_{E-LTF}$ with any number of E-LTF symbols are explained. For instance, values of a=4 and b=2 for $N_{E-LTF}$=6 give the matrix $P_{6\times6}$ used in the WLAN 802.11ax standard.

There many other variants that can be used for designing the $P_{E-LTF}$ matrix, however, they would remain static once the number of E-LTF symbols is decided. The size of the P matrix is given by $N_{col-P_{E-LTF}}$ and from the previous embodiments this is not the same as the number of E-LTF symbols.

Thus, $N_{col-P_{E-LTF}}$ can be sent explicitly or it can be inferred from the number of E-LTFs and extra information like the number of zero elements or replicated elements, for example. Thus, there is no need (although it is possible) to transmit the $P_{E-LTF}$ matrices but rather pre-agree on which matrix would be used for each number of E-LTF symbols and then index them with the value of $N_{E-LTF}$.

Generalizing $P_{E-LTF}$ with Hadamard matrices means: If $N_{E-LTF}=2^i$ for i positive integer, then $P_{E-LTF}=P_{2^i}$ for i>3, where $$P_{2^i} = \begin{bmatrix} P_{2^{i-1}} & P_{2^{i-1}} \\ P_{2^{i-1}} & P_{2^{i-1}} \end{bmatrix} \text{ and } P_8 = P_{8\times8}$$

Generalizing $P_{E-LTF}$ with DFT matrices means: For any $N_{E-LTF}>8$ the $i^{th}$ row and $j^{th}$ column of $P_{E-LTF}$ is given by $$[P_{E-LTF}]_{i,j} = (-1)^{I_a} w^{((i-1)(j-1))} \text{ where } w = \exp\left(-j\frac{2\pi}{N_{E-LTF}}\right) \text{ and}$$

$$I_a = \begin{cases} 1 & \text{if } \mod(j, a) = b \\ 0 & \text{otherwise} \end{cases}$$

The function mod(j, α) gives the residue after dividing j/α, for example: j=[1 2 3 6 8 10], mod(j,4)=[1 2 3 2 0 2].

The total number of E-LTF symbols is chosen by the method shown in FIG. 4. The minimum number of E-LTF symbols in this case would be $N_{minE-LTF}=N_{sts}+1$. This means that at least one row of the $P_{E-LTF}$ matrix is unused, and it enables interference channel estimation at the receiver.

Thus, according to this second embodiment, in addition to the selection of parameters as explained above with respect to the first embodiment, the number of elements in each orthogonal sequences is equal to $N_{col-P_{E-LTF}}=N_{E-LTF}$. There are more orthogonal sequences than spatial streams, that is, $N_{sts}+1 \leq N_{col-P_{E-LTF}}$. For each tone each orthogonal sequence is multiplied with the corresponding E-LTF tone sequence. This yields $N_{col-P_{E-LTF}}=N_{E-LTF}$ E-LTF symbols per each spatial stream.

In an example, it holds for $N_{sts}=2$, $N_{col-P_{E-LTF}}=N_{E-LTF}$:

|  | Symbol 1 | Symbol 2 | Symbol 3 | Symbol 4 |
|---|---|---|---|---|
| $P_{E-LTF} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}$ | $ELTF_k \cdot (1)$<br>$ELTF_k \cdot (1)$ | $ELTF_k \cdot (-1)$<br>$ELTF_k \cdot (1)$ | $ELTF_k \cdot (1)$<br>$ELTF_k \cdot (-1)$ | $ELTF_k \cdot (1)$<br>$ELTF_k \cdot (1)$ |

Figure 13:
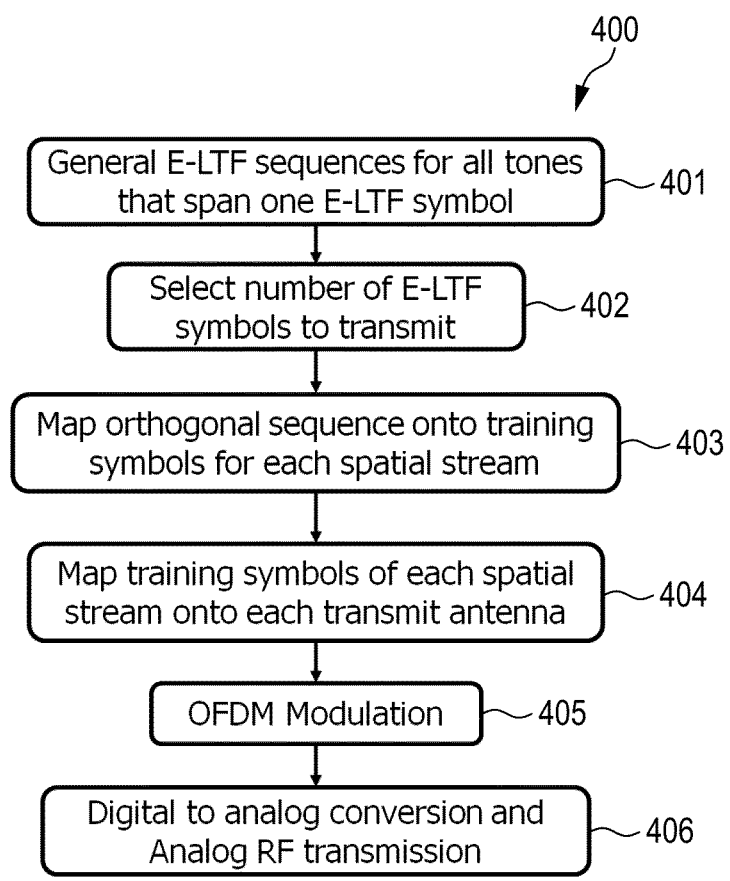
FIG. 13 shows a flow chart of another embodiment of a first communication method of the first communication device according to the present disclosure.

FIG. 13 shows a flow chart 400 summarizing the main operations done at the transmitter according to the present disclosure. In a first step 401 the E-LTF sequences are defined from several types, e.g. from three types (1xHE-LTF, 2xHE-LTF, and 4xHE-LTF) as defined in the standard amendment IEEE 802.11ax. In a second step 402 the number of E-LTF symbols ($N_{E-LTF}$; representing the first number) is defined based on the number of spatial streams and interference conditions. In a third step 403 $N_{E-LTF}$ training symbols (each spanning many tones) per each spatial stream to transmit are generated. In a fourth step 404 the symbols of each spatial stream are mapped into the transmit antennas via a spatial mapping defined by the Q matrix as defined in the standard amendment IEEE 802.11ax. In a fifth step 405 the OFDM modulation is a standard procedure that involves creating a time domain signal that combines all frequency tones for each E-LTF symbol. In a sixth step the digital signals assigned to each antenna are converted into analog signals and mapped into waveforms that are finally transmitted via radio frequency (RF) waves.

Adding more orthogonal sequences, as proposed according to the present disclosure, can also enable more spatial streams to be transmitted, e.g., support 16 spatial streams for IEEE802.11be. In addition, in the case of overlapping BSSs (OBSS), if there is coordination between BSSs to start a PPDU at the same time, then the orthogonal sequences can be assigned in such a way that the BSSs use different sequences so that their cross-interference can be reduced.

In the following receiver aspects for interference channel estimation and suppression will be described.

The preamble of the PPDU contains several legacy training and signaling fields in addition to signaling fields corresponding to the latest standard amendment. This means that, before the E-LTF symbols are received, the receiver should have achieved synchronization and successfully decoded all required parameters to process the E-LTF symbols.

Figure 14:
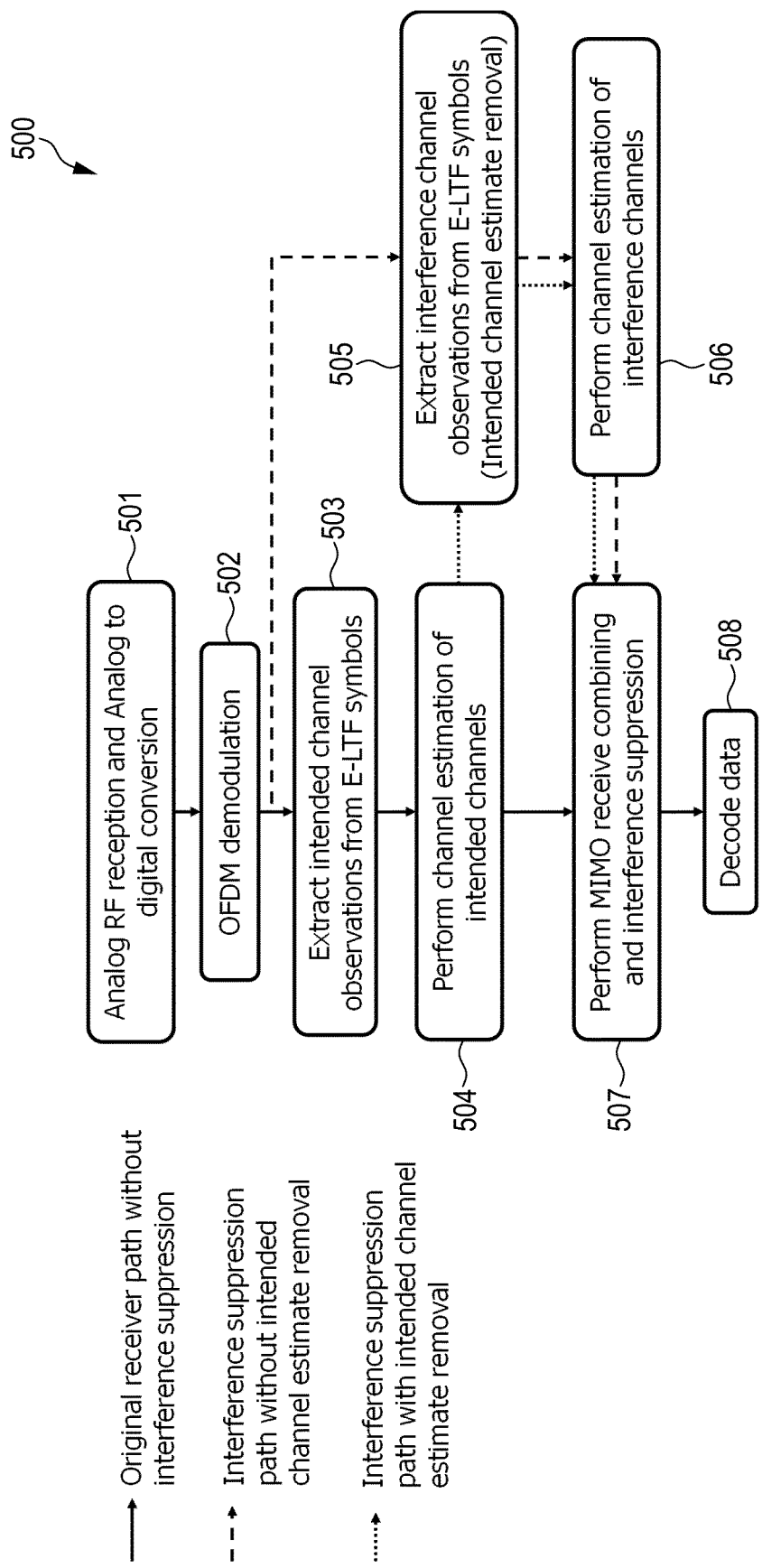
FIG. 14 shows a flow chart of another embodiment of a second communication method of the second communication device according to the present disclosure.

FIG. 14 shows a flow chart 500 summarizing the main operations done at the receiver according to the present disclosure to suppress the effect of interference with MIMO processing based on E-LTF symbols. In a first step 501 the PPDU is processed in the RF analog domain, then converted into digital signals and OFDM demodulated in step 502. At this point, the receiver can obtain the received E-LTF symbols and data payload symbols for each tone. The received E-LTF symbols can be represented as $$Y_k = H_k [A^k_{E-LTF}]_{1:N_{sts},:} ELTF_k + Y_k^{Int} + N_k^o$$

where $H_k$ represents the equivalent channel matrix (including the effect of beamforming) at tone k of size $N_{rx} \times N_{sts}$ where $N_{rx}$ is the number of antennas at the receiver. The matrix $$[A^k_{E-LTF}]_{1:N_{sts},:}$$

corresponds to the first $N_{sts}$ rows of the $A_{E-LTF}^k$ matrix since the rest are not transmitted. It is important to note that $N_{sts}$ rows of the $A_{E-LTF}^k$ matrix are assigned the spatial streams of intended STAs, whether they are the first or last or other combination does not change the application of the proposed methods. The matrix $N_k^O$ represents the noise and the matrix $Y_k^{Int}$ represents the interference.

To extract the (one or more) intended channel observations of one or more intended channels (i.e. channels with intended STAs), denoted as $\hat{Y}_k$, the receiver performs the following operations in step 503. The E-LTF sequence is removed by multiplying $Y_k$ with $ELTF_k$ (recall that $ELTF_k$ is either "1", "−1", or "0"). This operation should also account for tone shifts in case they are present, as explained above in the second embodiment. The received signal after removing the E-LTF sequences is denoted as $Y_k^{NE}$. Subsequently, one or more intended channel observations are obtained for each spatial stream. This operation depends on each sounding approach.

For the approach adding silent symbols (first embodiment), the columns of $Y_k^{NE}$ that correspond to zero values in the Sp sequence are selected:

$$\hat{Y}_k = [Y_k^{NE}]_{:,Sp=0}$$

For the first variant of the approach adding E-LTF symbols (second embodiment), the first columns of $Y_k^{NE}$ that match the number of columns of the $P_{E-LTF}$ matrix ($N_{col-P_{E-LTF}}$) are selected. If the whole $P_{E-LTF}$ matrix was replicated, then the columns that contain all the replicas of $P_{E-LTF}$ matrix are selected:

$$\hat{Y}_k = [Y_k^{NE}]_{:,1:(n_r \cdot N_{col-P_{E-LTF}})} \text{ for } n_r = \left\lceil \frac{N_{E-LTF}}{N_{col-P_{E-LTF}}} \right\rceil$$

where the operator $\lceil \cdot \rceil$ stands for rounding to the smallest nearest integer (e.g., $\lceil 1.1 \rceil = 1, \lceil 2.8 \rceil = 2$).

For the second variant of the approach adding E-LTF symbols (third embodiment), all columns of $Y_k^{NE}$, $\hat{Y}_k = Y_k^{NE}$ are selected.

After having channel observations of intended STAs the corresponding channel estimates are found in step 504 by doing a matrix multiplication with the complex conjugate of the rows of the $P_{E-LTF}$ matrix that were assigned each spatial stream. Thus, the channel estimates can be obtained as $$\hat{H}_k = \frac{1}{N_{col-P_{E-LTF}}} \hat{Y}_k [(P_{E-LTF})^H]_{1:N_{sts}}$$

where $N_{col-P_{E-LTF}}$ corresponds to the number of columns in the $P_{E-LTF}$ matrix. In the case where there are several replicas of the $P_{E-LTF}$ matrix within $\hat{Y}_k$ (only possible for the second embodiment), a separate channel estimate is computed for each block of $N_{col-P_{E-LTF}}$ columns of $\hat{Y}_k$ and a sample average is done.

To extract the (one or more) interference channel observations of one or more interference channels, denoted as $\hat{Y}_k^i$, the receiver can use the original E-LTF symbols and/or intended channel removal methods based on previously obtained estimates from the intended channels. As an example, the receiver can perform the following operations in step 505. The E-LTF sequence is removed by multiplying $Y_k$ with $ELTF_k$ (wherein $ELTF_k$ is either "1", "−1", or "0"). This operation may also account for tone shifts in case they were present (as in an option of the second embodiment). The received signal after removing the E-LTF sequences is denoted as $Y_k^{NE}$. Subsequently, one or more interference channel observations are obtained. This operation depends on each sounding approach.

For the approach adding silent symbols (first embodiment), the columns of $Y_k^{NE}$ that correspond to "1" values in the Sp sequence are selected:

$$\hat{Y}_k^i = [Y_k^{NE}]_{:,Sp=1}$$

For the first variant of the approach adding E-LTF symbols (second embodiment), wherein $N_{col-P_{E-LTF}}$ is the number of columns in the $P_{E-LTF}$ matrix, the columns of $Y_k^{NE}$ are selected that follow $N_{col-P_{E-LTF}}$, which correspond to the replicated symbols, and to each replica the original column is subtracted:

$$\hat{Y}_k^i = [Y_k^{NE}]_{:,(N_{col-P_{E-LTF}}+1):N_{E-LTF}} - [Y_k^{NE-ORG}]_{:,1:N_{rep}}$$

where $Y_k^{NE-ORG} = [Y_k^{NE}, Y_k^{NE}, Y_k^{NE}, \ldots]$.

Another variant is to perform intended channel removal by subtracting the channel estimates of intended transmitters. This operation yields:

$$\hat{Y}_k^i = [Y_k^{NE}]_{:,(N_{col-P_{E-LTF}}+1):N_{E-LTF}} - \hat{H}_k[A_{E-LTF-ORG}^k]_{:,1:N_{rep}} ELTF_k$$

where $A_{E-LTF-ORG}^k = \left[[A_{E-LTF}^k]_{1:N_{sts},1:N_{col-P_{E-LTF}}},\right.$ $$[A_{E-LTF}^k]_{1:N_{sts},1:N_{col-P_{E-LTF}}}, [A_{E-LTF}^k]_{1:N_{sts},1:N_{col-P_{E-LTF}}}, \ldots \right].$$

For the second variant of the approach adding E-LTF symbols (third embodiment), all columns of $Y_k$ are selected and a matrix multiplication is done with the complex conjugate of the rows of the $P_{E-LTF}$ matrix that were not assigned any spatial stream. That is:

$$\hat{Y}_k^i = Y_k^{NE}[(P_{E-LTF})^H]_{N_{sts}+1:N_{col-P_{E-LTF}}}.$$

where $P_{E-LTF}$ is a squared matrix so $N_{col-P_{E-LTF}}$ is also the number of rows in $P_{E-LTF}$.

Another variant is to perform intended channel removal by subtracting the channel estimates of intended transmitters. This operation yields:

$$\hat{Y}_k^i = Y_k^{NE} - \hat{H}_k[A_{E-LTF}^k]_{1:N_{sts},:} ELTF_k.$$

The interference channel estimates are obtained in step 506 by simply normalizing the interfering channel observations such that:

$$\hat{H}_k^i = \frac{1}{\sqrt{tr(\hat{Y}_k^i \hat{Y}_k^{iH})}} \hat{Y}_k^i$$

where tr(·) refers to the trace operator.

After having intended channel estimates and interference channel estimates, the following MIMO combining matrix can be computed in step 507, for each data tone, to suppress the effect of interference at the receiver:

$$V_k = (\hat{H}_k \hat{H}_k^H + \alpha_n I_{N_{rx}} + \alpha_i \hat{H}_k^i \hat{H}_k^{iH})^{-1} \hat{H}_k$$

where the scalar parameters $\alpha_n$ and $\alpha_i$ are regularization terms.

The matrix $V_k$ has size $N_{rx} \times N_{sts}$ and to decode the data symbols received in the $k^{th}$ tone, the receiver needs to multiply its transpose complex conjugate with the received symbols from all antennas corresponding to the data payload of the PPDU. That is, $$\hat{s}_k = V_k^H y_k^{RX}$$

where $y_k^{RX}$ is the received signal from antennas for a given data symbol in the $k^{th}$ tone, and $\hat{s}_k$ contains the data symbol estimates for each transmitted spatial stream. Finally, the receiver can decode the data from the data symbol estimates in step 508.

Thus, according to the present disclosure, the transmission training sequences contain distinct orthogonal sequences. The transmission training sequences are mapped to the training symbols and the result forms the training field. Each spatial stream is identified by a distinct orthogonal sequence which has been mapped to the training symbols. Since there may be more than one spatial stream, after mapping distinct orthogonal sequences with the training symbols there are distinct sets of training symbols, one per spatial stream. The already distinct sets of training symbols are then mapped to transmit antenna along with the payload data per spatial stream.

The relationship between number of training symbols ($N_{E-LTF}$), number of orthogonal sequences (denoted below as $N_{col}$, number of columns of P matrix), and number of spatial streams ($N_{sts}$) is the following: To estimate $N_{sts}$ spatial streams $N_{col} \geq N_{sts}$ is needed. To transmit $N_{col}$ orthogonal sequences $N_{E-LTF} \geq N_{col}$ is needed. In the disclosed approaches, the minimum condition to support interference channel estimation is that $N_{E-LTF} \geq N_{sts}+1$, which can mean $N_{E-LTF} > N_{col} = N_{sts}$ or $N_{E-LTF} = N_{col} > N_{sts}$.

For the approach using silent symbols, $N_{E-LTF} > N_{col} > N_{sts}$ may hold. For example, $N_{sts}=2$ spatial streams mapped into $N_{col}=4$ orthogonal sequences and add two silent symbols such that $N_{E-LTF}=6$. Similarly, for the approach adding training symbol replicas (that may include a tone shift), $N_{E-LTF} > N_{col} > N_{sts}$ may hold as well. For example, $N_{sts}=2$ spatial streams mapped into $N_{col}=4$ orthogonal sequences and add two replicated symbols such that $N_{E-LTF}=6$. In contrast, for the approach adding training symbols to support a larger P matrix, there is the differentiation that $N_{E-LTF}=N_{col}$ always, and $N_{col} > N_{sts}$.

From the training field the receiver can extract two types of information: A first type intended for channel estimation of intended transmitters that comes from the orthogonal sequences that were mapped to each spatial stream, and a second type that refers to the unused orthogonal sequences, zeros sequences or replicated sequences. Once these two types of information are available, then the receiver can i) do MIMO received combining and interference suppression or ii) use the intended channel estimates (first type of information) to remove it from the second type of information and create interference channel estimates, and then do MIMO received combining and interference suppression The present disclosure may obtain one or more of the following advantages. Adding more channel observations for interference enables the receiver to estimate the interfering channel and perform MIMO interference suppression. This increases the robustness of communications and avoids retransmissions, which in turn reduces latency. Adding more orthogonal sequences may further enable channel sounding of more spatial streams and reduce interference between OBSSs by coordinating the orthogonal sequences allocation among BSSs.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits or circuitry. A circuit is a structural assemblage of electronic components including conventional circuit elements, integrated circuits including application specific integrated circuits, standard integrated circuits, application specific standard products, and field programmable gate arrays. Further, a circuit includes central processing units, graphics processing units, and microprocessors which are programmed or configured according to software code. A circuit does not include pure software, although a circuit includes the above-described hardware executing software. A circuit or circuitry may be implemented by a single device or unit or multiple devices or units, or chipset(s), or processor(s).

It follows a list of further embodiments of the disclosed subject matter:

1. First communication device configured to transmit data to a second communication device, the first communication device comprising circuitry configured to:
    generate a second number of mutually orthogonal sequences;
    generate a third number of one or more spatial streams, each spatial stream carrying payload data;
    generate a fourth number of transmission training sequences, each comprising, in addition to a distinct orthogonal sequence of said mutually orthogonal sequences, one or more zeros and/or a subset of said distinct orthogonal sequence;
    generate a training field by mapping the transmission training sequences into a first number of training symbols, each training symbol spanning a plurality of tones; and
    arrange the training field before and/or between the payload of the spatial streams to enable channel estimation by the second communication device,
    wherein the first number of training symbols equals the length of the transmission training sequences,
    wherein the first number of training symbols is set to be larger than the third number of spatial streams and/or the second number of orthogonal sequences is set to be larger than the third number of spatial streams, and
    wherein the fourth number of transmission training sequences is set to be larger than or equal to the third number of spatial streams.

2. First communication device as defined in embodiment 1,
    wherein the circuitry is configured to transmit first signaling information indicating one or more of the first number of training symbols, the second number of orthogonal sequences, the third number of spatial streams, the fourth number of transmission training sequences, the presence, number and/or position of zeros and/or replicated elements represented by said subset of said distinct orthogonal sequence in the transmission training sequences.

3. First communication device as defined in any preceding embodiment,
    wherein the circuitry is configured to obtain second signaling information from the second communication device, said second signaling information indicating if the first number of training symbols and/or the second number of orthogonal sequences shall be increased or decreased.

4. First communication device as defined in embodiment 3,
    wherein the circuitry is configured to obtain as second signaling information one or more of a maximum number of training symbols, an interference indicator, an interference margin and a number of training symbols and/or orthogonal sequences to add or remove.

5. First communication device as defined in any preceding embodiment,
    wherein the circuitry is configured to add one or more zeros at the beginning, at the end and/or in between the non-zero elements of a distinct orthogonal sequence in the transmission training sequences.

6. First communication device as defined in embodiment 5,
    wherein the circuitry is configured to limit the number of consecutively arranged zeros in the transmission training sequences such that the time length of said consecutively arranged zeros is smaller than an interframe space.

7. First communication device as defined in any preceding embodiment,
    wherein the circuitry is configured to add one or more replicated elements in the transmission training sequences, wherein the tones of the training symbols mapped into replicated elements are shifted in frequency compared to the tones of the corresponding elements of the original orthogonal sequence.

8. First communication device as defined in embodiment 7,
    wherein the circuitry is configured perform the tone shift such that it does not change reserved tone areas and/or periodicity of the original training symbol.

9. First communication device as defined in embodiment 7 or 8,
    wherein the circuitry is configured to transmit first signaling information indicating if and which tone shifts are applied to replicated elements of the transmission training sequences.

10. First communication device as defined in embodiment 7, 8 or 9,
    wherein the circuitry is configured to obtain second signaling information from the second communication device, said second signaling information indicating to change the tone shift.

11. First communication device as defined in any preceding embodiment,
    wherein the circuitry is configured to generate the training field by multiplying, elementwise and/or per tone, the transmission training sequences with the training symbols.

12. First communication device as defined in any preceding embodiment,
wherein the circuitry is configured to identify a spatial stream by a distinct orthogonal sequence, wherein the training field contains a third number of distinct sets of training symbols that have been mapped with distinct orthogonal sequences, and
to map the corresponding sets of training symbols and payload data of each spatial stream directly or indirectly onto transmit antennas using multiple input multiple output, MIMO, techniques.

13. Second communication device configured to receive data from a first communication device, the second communication device comprising circuitry configured to:
  obtain one or more intended channel observations of one or more channels between the first communication device and the second communication device based on at least a part of a training field comprising a first number of training symbols, the training field being arranged before and/or between the payload of a third number of one or more spatial streams received from the first communication device, wherein each spatial stream carries payload data, each training symbol spans a plurality of tones, and a second number of mutually orthogonal sequences is comprised in a fourth number of transmission training sequences mapped into the training symbols of the training field;
  perform interference channel estimation of one or more potential interference channels based on another part of said training field; and
  perform interference suppression based on interference channel estimation information resulting from the interference channel estimation,
  wherein the first number of training symbols equals the length of a transmission training sequence,
  wherein the first number of training symbols is larger than the third number of spatial streams and/or the second number of orthogonal sequences is larger than the third number of spatial streams, and
  wherein the fourth number of transmission training sequences is set to be larger than or equal to the third number of spatial streams.

14. Second communication device as defined in embodiment 13,
wherein the circuitry is configured to obtain the intended channel observations from a part of the training field by extracting them from the orthogonal sequences mapped into the training symbols and to perform intended channel estimation of the one or more channels based on the obtained intended channel observations to refine the interference channel estimate.

15. Second communication device as defined in embodiment 13 or 14,
wherein the circuitry is configured
to obtain the interference channel observations based on another part of said training field and to perform interference channel estimation of the one or more potential interference channels based on the obtained interference channel observations.

16. Second communication device as defined in any one of embodiments 13 to 15,
wherein the circuitry is configured to obtain the interference channel observations from another part of the training field by extracting them from one or more zeros and/or a subset of a distinct orthogonal sequence comprised in a transmission training sequence in addition to said distinct orthogonal sequence.

17. Second communication device as defined in any one of embodiments 13 to 16,
wherein the circuitry is configured to receive first signaling information from the first communication device, the first signaling information indicating one or more of the first number of training symbols, the second number of orthogonal sequences, the presence, number and/or position of zeros and/or replicated elements represented by a subset of said distinct orthogonal sequence in the transmission training sequences, and if and which tone shifts are applied to replicated elements of the transmission training sequences.

18. Second communication device as defined in any one of embodiments 13 to 17,
wherein the circuitry is configured to transmit second signaling information, said second signaling information indicating if the first number of training symbols and/or the second number of orthogonal sequences shall be increased or decreased.

19. Second communication device as defined in any one of embodiments 13 to 18,
wherein the circuitry is configured to continue to perform the receive processing in case of silent periods without discarding payload data.

20. Second communication device as defined in any one of embodiments 13 to 19,
wherein the circuitry is configured to decode data from the received spatial streams.

21. First communication method configured to transmit data to a second communication device, the first communication method comprising:
  generating a second number of mutually orthogonal sequences;
  generating a third number of one or more spatial streams, each spatial stream carrying payload data;
  generating a fourth number of transmission training sequences, each comprising, in addition to a distinct orthogonal sequence of said mutually orthogonal sequences, one or more zeros and/or a subset of said distinct orthogonal sequence; and
  generating a training field by mapping the transmission training sequences into a first number of training symbols, each training symbol spanning a plurality of tones; and
  arranging the training field before and/or between the payload of the spatial streams to enable channel estimation by the second communication device,
  wherein the first number of training symbols equals the length of the transmission training sequences,
  wherein the first number of training symbols is set to be larger than the third number of spatial streams and/or the second number of orthogonal sequences is set to be larger than the third number of spatial streams, and
  wherein the fourth number of transmission training sequences is set to be larger than or equal to the third number of spatial streams.

22. Second communication method configured to receive data from a first communication device, the second communication method comprising:
  obtaining one or more intended channel observations of one or more channels between the first communication device and the second communication device based on at least a part of a training field comprising a first number of training symbols, the training field being arranged before and/or between the payload of a third number of one or more spatial streams received from the first communication device, wherein each spatial stream carries payload data, each training symbol spans a plurality of tones, and a second number of mutually orthogonal sequences is comprised in a fourth number of transmission training sequences mapped into the training symbols of the training field;

performing interference channel estimation of one or more potential interference channels based on another part of said training field; and performing interference suppression based on interference channel estimation information resulting from the interference channel estimation, wherein the first number of training symbols equals the length of a transmission training sequence, wherein the first number of training symbols is larger than the third number of spatial streams and/or the second number of orthogonal sequences is larger than the third number of spatial streams, and wherein the fourth number of transmission training sequences is set to be larger than or equal to the third number of spatial streams.

23. A non-transitory computer-readable recording medium that stores therein a computer program product, which, when executed by a processor, causes the method according to embodiment 21 or 22 to be performed.

24. A computer program comprising program code means for causing a computer to perform the steps of said method according to embodiment 21 or 22 when said computer program is carried out on a computer.

The invention claimed is:

1. A first communication device configured to transmit data to a second communication device, the first communication device comprising:
circuitry configured to:
generate a second number of mutually orthogonal sequences;
generate a third number of one or more spatial streams, each spatial stream carrying payload data;
generate a training field by mapping a length of a fourth number of transmission training sequences into a first number of training symbols, each training symbol spanning a plurality of tones, and each transmission training sequence comprising, in addition to a distinct orthogonal sequence of said mutually orthogonal sequences, one or more zeros and/or a subset of said distinct orthogonal sequence; and
arrange the training field before and/or between the payload of the spatial streams to enable channel estimation by the second communication device, wherein
the first number of training symbols equals the length of the fourth number of transmission training sequences,
the first number of training symbols is set to be larger than the third number of spatial streams and/or the second number of orthogonal sequences is set to be larger than the third number of spatial streams, and
the fourth number of transmission training sequences is set to be larger than or equal to the third number of spatial streams.

2. The first communication device of claim 1, wherein the circuitry is configured to transmit first signaling information indicating one or more of the number of training symbols, the second number of orthogonal sequences, the third number of spatial streams, the fourth number of transmission training sequences, the presence, number and/or position of zeros and/or replicated elements represented by said subset of said distinct orthogonal sequence in the transmission training sequences.

3. The first communication device of claim 1, wherein the circuitry is configured to obtain second signaling information from the second communication device, said second signaling information indicating if the first number of training symbols and/or the second number of orthogonal sequences shall be increased or decreased.

4. The first communication device of claim 3, wherein the circuitry is configured to obtain as second signaling information one or more of a maximum number of training symbols, an interference indicator, an interference margin and a number of training symbols and/or orthogonal sequences to add or remove.

5. The first communication device of claim 1, wherein the circuitry is configured to add one or more zeros at the beginning, at the end and/or in between the non-zero elements of a distinct orthogonal sequence in the transmission training sequences.

6. The first communication device of claim 5, wherein the circuitry is configured to limit the number of consecutively arranged zeros in the transmission training sequences such that the time length of said consecutively arranged zeros is smaller than an interframe space.

7. The first communication device of claim 1, wherein the circuitry is configured to add one or more replicated elements in the transmission training sequences, wherein the tones of the training symbols mapped into replicated elements are shifted in frequency compared to the tones of the corresponding elements of the original orthogonal sequence.

8. The first communication device of claim 7, wherein the circuitry is configured perform the tone shift such that it does not change reserved tone areas and/or periodicity of the original training symbol.

9. The first communication device of claim 7, wherein the circuitry is configured to transmit first signaling information indicating if and which tone shifts are applied to replicated elements of the transmission training sequences.

10. The first communication device of claim 7, wherein the circuitry is configured to obtain second signaling information from the second communication device, said second signaling information indicating to change the tone shift.

11. The first communication device of claim 1, wherein the circuitry is configured to generate the training field by multiplying, element-wise and/or per tone, the transmission training sequences with the training symbols.

12. The first communication device of claim 1, wherein the circuitry is configured to identify a spatial stream by a distinct orthogonal sequence, wherein the training field contains a third number of distinct sets of training symbols that have been mapped with distinct orthogonal sequences, and to map the corresponding sets of training symbols and payload data of each spatial stream directly or indirectly onto transmit antennas using multiple input multiple output (MIMO) techniques.

13. A second communication device configured to receive data from a first communication device, the second communication device comprising:
circuitry configured to:
obtain one or more intended channel observations of one or more channels between the first communication device and the second communication device based on at least a part of a training field comprising a first number of training symbols, the training field being arranged before and/or between the payload of a third number of one or more spatial streams received from the first communication device, wherein each spatial stream carries payload data, each training symbol spans a plurality of tones, and a second number of mutually orthogonal sequences is comprised in a fourth number of transmission training sequences mapped into the first number of training symbols of the training field;

perform interference channel estimation of one or more potential interference channels based on another part of said training field; and perform interference suppression based on interference channel estimation information resulting from the interference channel estimation, wherein the first number of training symbols equals the length of a transmission training sequence, the first number of training symbols is larger than the third number of spatial streams and/or the second number of orthogonal sequences is larger than the third number of spatial streams, and the fourth number of transmission training sequences is set to be larger than or equal to the third number of spatial streams.

14. The second communication device of claim 13, wherein the circuitry is configured to obtain the intended channel observations from a part of the training field by extracting them from the orthogonal sequences mapped into the training symbols and to perform intended channel estimation of the one or more channels based on the obtained intended channel observations to refine the interference channel estimate, and/or obtain the interference channel observations based on another part of said training field and to perform interference channel estimation of the one or more potential interference channels based on the obtained interference channel observations.

15. The second communication device of claim 13, wherein the circuitry is configured to obtain the interference channel observations from another part of the training field by extracting them from one or more zeros and/or a subset of a distinct orthogonal sequence comprised in a transmission training sequence.

16. The second communication device of claim 13, wherein the circuitry is configured to receive first signaling information from the first communication device, the first signaling information indicating one or more of the first number of training symbols, the second number of orthogonal sequences, the presence, number and/or position of zeros and/or replicated elements represented by a subset of a distinct orthogonal sequence in the transmission training sequences, and if and which tone shifts are applied to replicated elements of the transmission training sequences, and/or to transmit second signaling information, said second signaling information indicating if the first number of training symbols and/or the second number of orthogonal sequences shall be increased or decreased.

17. The second communication device of claim 13, wherein the circuitry is configured to continue to perform the receive processing in case of silent periods without discarding payload data and/or to decode data from the received spatial streams.

18. A communication method configured to transmit data to a second communication device, the first communication method comprising:

generating a second number of mutually orthogonal sequences;

generating a third number of one or more spatial streams, each spatial stream carrying payload data;

generating a fourth number of transmission training sequences, each comprising, in addition to a distinct orthogonal sequence of said mutually orthogonal sequences, one or more zeros and/or a subset of said distinct orthogonal sequence; and generating a training field by mapping the fourth number of transmission training sequences into a first number of training symbols, each training symbol spanning a plurality of tones; and arranging the training field before and/or between the payload of the spatial streams to enable channel estimation by the second communication device, wherein the first number of training symbols equals the length of the fourth number of transmission training sequences, the first number of training symbols is set to be larger than the third number of spatial streams and/or the second number of orthogonal sequences is set to be larger than the third number of spatial streams, and the fourth number of transmission training sequences is set to be larger than or equal to the third number of spatial streams.

19. A non-transitory computer-readable recording medium that stores therein a computer program product, which, when executed by a processor, causes the method according to claim 18 to be performed.

20. A communication method configured to receive data from a first communication device, the communication method comprising:

obtaining one or more intended channel observations of one or more channels between the first communication device and the second communication device based on at least a part of a training field comprising a first number of training symbols, the training field being arranged before and/or between the payload of a third number of one or more spatial streams received from the first communication device, wherein each spatial stream carries payload data, each training symbol spans a plurality of tones, and a second number of mutually orthogonal sequences is comprised in a fourth number of transmission training sequences mapped into the first number of training symbols of the training field;

performing interference channel estimation of one or more potential interference channels based on another part of said training field; and performing interference suppression based on interference channel estimation information resulting from the interference channel estimation, wherein the first number of training symbols equals the length of a transmission training sequence, the first number of training symbols is larger than the third number of spatial streams and/or the second number of orthogonal sequences is larger than the third number of spatial streams, and the fourth number of transmission training sequences is set to be larger than or equal to the third number of spatial streams.

\* \* \* \* \*